US010369864B2

(12) United States Patent
Ishizeki et al.

(10) Patent No.: US 10,369,864 B2
(45) Date of Patent: Aug. 6, 2019

(54) VEHICLE AIR CONDITIONER DEVICE

(71) Applicant: SANDEN HOLDINGS CORPORATION, Isesaki-shi, Gunma (JP)

(72) Inventors: Tetsuya Ishizeki, Isesaki (JP); Megumi Shigeta, Isesaki (JP); Yasunobu Takano, Isesaki (JP); Hidenori Takei, Isesaki (JP); Osamu Takazawa, Isesaki (JP)

(73) Assignee: SANDEN HOLDINGS CORPORATION, Isesaki-shi, Gunma (JP)

( * ) Notice: Subject to any disclaimer, the term of this patent is extended or adjusted under 35 U.S.C. 154(b) by 110 days.

(21) Appl. No.: 15/532,583

(22) PCT Filed: Dec. 1, 2015

(86) PCT No.: PCT/JP2015/083695
§ 371 (c)(1),
(2) Date: Jun. 2, 2017

(87) PCT Pub. No.: WO2016/088738
PCT Pub. Date: Jun. 9, 2016

(65) Prior Publication Data
US 2017/0326943 A1    Nov. 16, 2017

(30) Foreign Application Priority Data

Dec. 4, 2014    (JP) ................................ 2014-245739

(51) Int. Cl.
*B60H 1/00* (2006.01)
*B60H 1/22* (2006.01)
*B60H 1/32* (2006.01)

(52) U.S. Cl.
CPC ..... *B60H 1/00585* (2013.01); *B60H 1/00278* (2013.01); *B60H 1/00885* (2013.01);
(Continued)

(58) Field of Classification Search
CPC ............ B60H 1/00278; B60H 1/00585; B60H 1/00885; B60H 1/00907; B60H 1/00921;
(Continued)

(56) References Cited

U.S. PATENT DOCUMENTS 5,299,431 A * 4/1994 Iritani ................ B60H 1/00021
62/159
5,878,589 A * 3/1999 Tanaka ............... B60H 1/00007
165/80.2

(Continued)

FOREIGN PATENT DOCUMENTS

CN    101652544 A    2/2010
CN    102555727 A    7/2012
(Continued)

OTHER PUBLICATIONS

Japan Patent Office, Notification of Reasons for Refusal issued in Japanese Patent Application No. 2014-245739, dated Jul. 24, 2018.
(Continued)

*Primary Examiner* — Henry T Crenshaw
(74) *Attorney, Agent, or Firm* — Baker Botts L.L.P.

(57) ABSTRACT

There is disclosed a vehicle air conditioner device which is capable of continuing air conditioning of a vehicle interior also in a case where a failure occurs in a solenoid valve to change a flow of a refrigerant in each operation mode. A vehicle air conditioner device 1 includes a solenoid valve 17 for cooling, a solenoid valve 21 for heating and a solenoid valve 22 for dehumidifying to switch respective operation modes of the vehicle air conditioner device. A controller changes and executes the respective operation modes of a heating mode, a dehumidifying mode, and a cooling mode.

(Continued)

The controller has a predetermined air conditioning mode during failure, and failure detecting means for detecting failure of the solenoid valve. In a case where the failure detecting means detects that the solenoid valves fail in the respective operation modes, the controller selects the air conditioning mode during failure in which vehicle interior air conditioning by the operation mode is achievable, to continue the air conditioning of the vehicle interior.

13 Claims, 19 Drawing Sheets

(52) U.S. Cl.
CPC ..... *B60H 1/00907* (2013.01); *B60H 1/00921* (2013.01); *B60H 1/00964* (2013.01); *B60H 1/00978* (2013.01); *B60H 1/22* (2013.01); *B60H 1/3205* (2013.01); *B60H 1/3213* (2013.01); *B60H 2001/00957* (2013.01); *B60H 2001/2246* (2013.01); *B60H 2001/3242* (2013.01); *B60H 2001/3285* (2013.01)

(58) Field of Classification Search
CPC .. B60H 1/00964; B60H 1/00978; B60H 1/22; B60H 1/3205; B60H 1/3213; B60H 2001/00957; B60H 2001/2246; B60H 2001/3242; B60H 2001/3285
See application file for complete search history.

(56) References Cited

U.S. PATENT DOCUMENTS 8,788,223 B2    7/2014  Willey et al.

| | | | |
|---|---|---|---|
| 2005/0241818 A1* | 11/2005 | Yakumaru | B60H 1/004 165/202 |
| 2011/0048671 A1* | 3/2011 | Nishikawa | B60H 1/00885 165/42 |
| 2013/0291577 A1* | 11/2013 | Miyakoshi | B60H 1/00392 62/151 |
| 2016/0193896 A1* | 7/2016 | Miyakoshi | B60H 1/00385 62/155 |
| 2017/0274733 A1* | 9/2017 | Suzuki | F25B 41/04 |
| 2017/0326943 A1* | 11/2017 | Ishizeki | B60H 1/22 |

FOREIGN PATENT DOCUMENTS

| | | | |
|---|---|---|---|
| JP | 2008-292064 A | | 12/2008 |
| JP | 2008292064 A | * | 12/2008 |
| JP | 2012-158197 A | | 8/2012 |
| JP | 2012-250708 A | | 12/2012 |
| JP | 2012250708 A | * | 12/2012 |
| JP | 2014-051283 A | | 3/2014 |
| JP | 2014-058209 A | | 4/2014 |
| WO | 2005/121521 A2 | | 12/2005 |

OTHER PUBLICATIONS

Japan Patent Office, International Search Report issued in International Application No. PCT/JP2015/083695, dated Feb. 23, 2016.
The State Intellectual Property Office of the People's Republic of China,The First Office Action issued in Chinese Patent Application No. 201580065383.3, dated Sep. 26, 2018.

* cited by examiner

FIG. 3

| VALVE TYPE | OPERATION MODE | | | | |
|---|---|---|---|---|---|
| | COOLING | DEHUMIDIFYING AND COOLING | INTERNAL CYCLE | DEHUMIDIFYING AND HEATING | HEATING |
| SOLENOID VALVE FOR COOLING (17) | NON-ENERGIZED (OPENED) | NON-ENERGIZED (OPENED) | NON-ENERGIZED (OPENED) | ENERGIZED (CLOSED) | ENERGIZED (CLOSED) |
| SOLENOID VALVE FOR HEATING (21) | NON-ENERGIZED (CLOSED) | NON-ENERGIZED (CLOSED) | NON-ENERGIZED (CLOSED) | ENERGIZED (OPENED) | ENERGIZED (OPENED) |
| SOLENOID VALVE FOR DEHUMIDIFYING (22) | NON-ENERGIZED (CLOSED) | NON-ENERGIZED (CLOSED) | ENERGIZED (OPENED) | ENERGIZED (OPENED) | NON-ENERGIZED (CLOSED) |
| EVAPORATION PRESSURE ADJUSTMENT VALVE (11) | NON-ENERGIZED (OPENED) | NON-ENERGIZED (OPENED) | NON-ENERGIZED (OPENED) | ENERGIZED (CLOSED)/ NON-ENERGIZED (OPENED) | NON-ENERGIZED (OPENED) |
| OUTDOOR EXPANSION VALVE (6) | FULLY OPENED | LARGE BORE CONTROL | SHUT OFF | SMALL BORE CONTROL | SMALL BORE CONTROL |

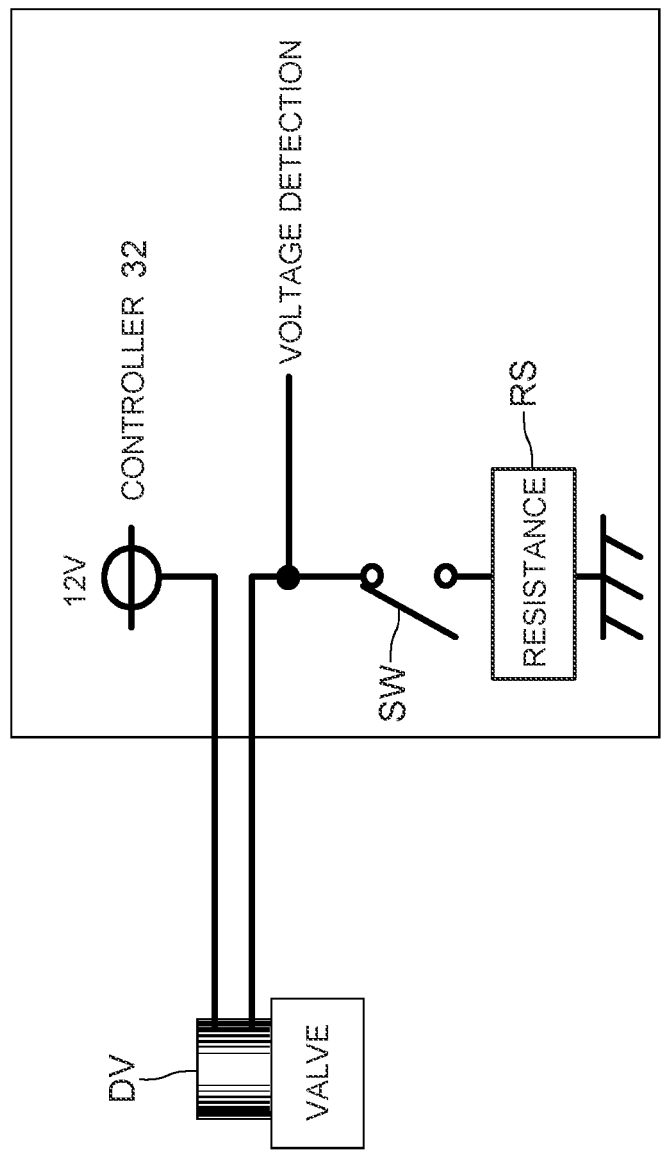

FIG. 7

| VALVE TYPE | OPERATION MODE | | | | |
|---|---|---|---|---|---|
| | COOLING | DEHUMIDIFYING AND COOLING | INTERNAL CYCLE | DEHUMIDIFYING AND HEATING | HEATING |
| SOLENOID VALVE FOR COOLING (17) | NON-ENERGIZED (OPENED) | NON-ENERGIZED (OPENED) | NON-ENERGIZED (OPENED) | ENERGIZED (CLOSED) | ENERGIZED (CLOSED) |
| SOLENOID VALVE FOR HEATING (21) | NON-ENERGIZED (CLOSED) | NON-ENERGIZED (CLOSED) | NON-ENERGIZED (CLOSED) | DISCONNECTED | ENERGIZED (OPENED) |
| SOLENOID VALVE FOR DEHUMIDIFYING (22) | NON-ENERGIZED (CLOSED) | NON-ENERGIZED (CLOSED) | ENERGIZED (OPENED) | ENERGIZED (OPENED) | NON-ENERGIZED (CLOSED) |
| EVAPORATION PRESSURE ADJUSTMENT VALVE (11) | NON-ENERGIZED (OPENED) | NON-ENERGIZED (OPENED) | NON-ENERGIZED (OPENED) | ENERGIZED (CLOSED)/ NON-ENERGIZED (OPENED) | NON-ENERGIZED (OPENED) |
| OUTDOOR EXPANSION VALVE (6) | FULLY OPENED | LARGE BORE CONTROL | SHUT OFF | SMALL BORE CONTROL | SMALL BORE CONTROL |

FIG. 8

| VALVE TYPE | OPERATION MODE | | | | |
|---|---|---|---|---|---|
| | COOLING | DEHUMIDIFYING AND COOLING | INTERNAL CYCLE | DEHUMIDIFYING AND HEATING | HEATING |
| SOLENOID VALVE FOR COOLING (17) | NON-ENERGIZED (OPENED) | NON-ENERGIZED (OPENED) | NON-ENERGIZED (OPENED) | ENERGIZED (CLOSED) | ENERGIZED (CLOSED) |
| SOLENOID VALVE FOR HEATING (21) | NON-ENERGIZED (CLOSED) | NON-ENERGIZED (CLOSED) | NON-ENERGIZED (CLOSED) | ENERGIZED (OPENED) | ENERGIZED (OPENED) |
| SOLENOID VALVE FOR DEHUMIDIFYING (22) | NON-ENERGIZED (CLOSED) | NON-ENERGIZED (CLOSED) | ENERGIZED (OPENED) | DISCONNECTED | NON-ENERGIZED (CLOSED) |
| EVAPORATION PRESSURE ADJUSTMENT VALVE (11) | NON-ENERGIZED (OPENED) | NON-ENERGIZED (OPENED) | NON-ENERGIZED (OPENED) | ENERGIZED (CLOSED)/ NON-ENERGIZED (OPENED) | NON-ENERGIZED (OPENED) |
| OUTDOOR EXPANSION VALVE (6) | FULLY OPENED | LARGE BORE CONTROL | SHUT OFF | SMALL BORE CONTROL | SMALL BORE CONTROL |

FIG. 9

| VALVE TYPE | OPERATION MODE | | | | |
|---|---|---|---|---|---|
| | COOLING | DEHUMIDIFYING AND COOLING | INTERNAL CYCLE | DEHUMIDIFYING AND HEATING | HEATING |
| SOLENOID VALVE FOR COOLING (17) | NON-ENERGIZED (OPENED) | NON-ENERGIZED (OPENED) | NON-ENERGIZED (OPENED) | ENERGIZED (CLOSED) | ENERGIZED (CLOSED) |
| SOLENOID VALVE FOR HEATING (21) | NON-ENERGIZED (CLOSED) | NON-ENERGIZED (CLOSED) | NON-ENERGIZED (CLOSED) | ENERGIZED (OPENED) | ENERGIZED (OPENED) |
| SOLENOID VALVE FOR DEHUMIDIFYING (22) | NON-ENERGIZED (CLOSED) | NON-ENERGIZED (CLOSED) | DISCONNECTED | ENERGIZED (OPENED) | NON-ENERGIZED (CLOSED) |
| EVAPORATION PRESSURE ADJUSTMENT VALVE (11) | NON-ENERGIZED (OPENED) | NON-ENERGIZED (OPENED) | NON-ENERGIZED (OPENED) | ENERGIZED (CLOSED)/ NON-ENERGIZED (OPENED) | NON-ENERGIZED (OPENED) |
| OUTDOOR EXPANSION VALVE (6) | FULLY OPENED | LARGE BORE CONTROL | SHUT OFF | SMALL BORE CONTROL | SMALL BORE CONTROL |

FIG. 10

| VALVE TYPE | OPERATION MODE | | | | |
|---|---|---|---|---|---|
| | COOLING | DEHUMIDIFYING AND COOLING | INTERNAL CYCLE | DEHUMIDIFYING AND HEATING | HEATING |
| SOLENOID VALVE FOR COOLING (17) | NON-ENERGIZED (OPENED) | NON-ENERGIZED (OPENED) | NON-ENERGIZED (OPENED) | ENERGIZED (CLOSED) | ENERGIZED (CLOSED) |
| SOLENOID VALVE FOR HEATING (21) | NON-ENERGIZED (CLOSED) | NON-ENERGIZED (CLOSED) | NON-ENERGIZED (CLOSED) | ENERGIZED (OPENED) | ENERGIZED (OPENED) |
| SOLENOID VALVE FOR DEHUMIDIFYING (22) | NON-ENERGIZED (CLOSED) | NON-ENERGIZED (CLOSED) | ENERGIZED (OPENED) | ENERGIZED (OPENED) | NON-ENERGIZED (CLOSED) |
| EVAPORATION PRESSURE ADJUSTMENT VALVE (11) | NON-ENERGIZED (OPENED) | NON-ENERGIZED (OPENED) | NON-ENERGIZED (OPENED) | DISCONNECTED | NON-ENERGIZED (OPENED) |
| OUTDOOR EXPANSION VALVE (6) | FULLY OPENED | LARGE BORE CONTROL | SHUT OFF | SMALL BORE CONTROL | SMALL BORE CONTROL |

FIG. 11

| VALVE TYPE | OPERATION MODE | | | | |
|---|---|---|---|---|---|
| | COOLING | DEHUMIDIFYING AND COOLING | INTERNAL CYCLE | DEHUMIDIFYING AND HEATING | HEATING |
| SOLENOID VALVE FOR COOLING (17) | NON-ENERGIZED (OPENED) | NON-ENERGIZED (OPENED) | NON-ENERGIZED (OPENED) | ENERGIZED (CLOSED) | ENERGIZED (CLOSED) |
| SOLENOID VALVE FOR HEATING (21) | NON-ENERGIZED (CLOSED) | NON-ENERGIZED (CLOSED) | NON-ENERGIZED (CLOSED) | ENERGIZED (OPENED) | ENERGIZED (OPENED) |
| SOLENOID VALVE FOR DEHUMIDIFYING (22) | NON-ENERGIZED (CLOSED) | NON-ENERGIZED (CLOSED) | ENERGIZED (OPENED) | ENERGIZED (OPENED) | NON-ENERGIZED (CLOSED) |
| EVAPORATION PRESSURE ADJUSTMENT VALVE (11) | NON-ENERGIZED (OPENED) | NON-ENERGIZED (OPENED) | NON-ENERGIZED (OPENED) | ENERGIZED (CLOSED)/ NON-ENERGIZED (OPENED) | NON-ENERGIZED (OPENED) |
| OUTDOOR EXPANSION VALVE (6) | FULLY OPENED | LARGE BORE CONTROL | SHUT OFF | DISCONNECTED | SMALL BORE CONTROL |

FIG. 12

| VALVE TYPE | OPERATION MODE | | | | |
|---|---|---|---|---|---|
| | COOLING | DEHUMIDIFYING AND COOLING | INTERNAL CYCLE | DEHUMIDIFYING AND HEATING | HEATING |
| SOLENOID VALVE FOR COOLING (17) | NON-ENERGIZED (OPENED) | NON-ENERGIZED (OPENED) | NON-ENERGIZED (OPENED) | ENERGIZED (CLOSED) | ENERGIZED (CLOSED) |
| SOLENOID VALVE FOR HEATING (21) | NON-ENERGIZED (CLOSED) | NON-ENERGIZED (CLOSED) | NON-ENERGIZED (CLOSED) | ENERGIZED (OPENED) | ENERGIZED (OPENED) |
| SOLENOID VALVE FOR DEHUMIDIFYING (22) | NON-ENERGIZED (CLOSED) | NON-ENERGIZED (CLOSED) | ENERGIZED (OPENED) | ENERGIZED (OPENED) | NON-ENERGIZED (CLOSED) |
| EVAPORATION PRESSURE ADJUSTMENT VALVE (11) | NON-ENERGIZED (OPENED) | NON-ENERGIZED (OPENED) | NON-ENERGIZED (OPENED) | ENERGIZED (CLOSED)/ NON-ENERGIZED (OPENED) | NON-ENERGIZED (OPENED) |
| OUTDOOR EXPANSION VALVE (6) | FULLY OPENED | DISCONNECTED | SHUT OFF | SMALL BORE CONTROL | SMALL BORE CONTROL |

FIG. 13

| VALVE TYPE | OPERATION MODE | | | | |
|---|---|---|---|---|---|
| | COOLING | DEHUMIDIFYING AND COOLING | INTERNAL CYCLE | DEHUMIDIFYING AND HEATING | HEATING |
| SOLENOID VALVE FOR COOLING (17) | NON-ENERGIZED (OPENED) | NON-ENERGIZED (OPENED) | NON-ENERGIZED (OPENED) | ENERGIZED (CLOSED) | ENERGIZED (CLOSED) |
| SOLENOID VALVE FOR HEATING (21) | NON-ENERGIZED (CLOSED) | NON-ENERGIZED (CLOSED) | NON-ENERGIZED (CLOSED) | ENERGIZED (OPENED) | DISCONNECTED |
| SOLENOID VALVE FOR DEHUMIDIFYING (22) | NON-ENERGIZED (CLOSED) | NON-ENERGIZED (CLOSED) | ENERGIZED (OPENED) | ENERGIZED (OPENED) | NON-ENERGIZED (CLOSED) |
| EVAPORATION PRESSURE ADJUSTMENT VALVE (11) | NON-ENERGIZED (OPENED) | NON-ENERGIZED (OPENED) | NON-ENERGIZED (OPENED) | ENERGIZED (CLOSED)/ NON-ENERGIZED (OPENED) | NON-ENERGIZED (OPENED) |
| OUTDOOR EXPANSION VALVE (6) | FULLY OPENED | LARGE BORE CONTROL | SHUT OFF | SMALL BORE CONTROL | SMALL BORE CONTROL |

FIG. 14

| VALVE TYPE | OPERATION MODE | | | | | |
|---|---|---|---|---|---|---|
| | COOLING | DEHUMIDIFYING AND COOLING | INTERNAL CYCLE | DEHUMIDIFYING AND HEATING | HEATING | |
| SOLENOID VALVE FOR COOLING (17) | NON-ENERGIZED (OPENED) | NON-ENERGIZED (OPENED) | NON-ENERGIZED (OPENED) | ENERGIZED (CLOSED) | ENERGIZED (CLOSED) | |
| SOLENOID VALVE FOR HEATING (21) | NON-ENERGIZED (CLOSED) | NON-ENERGIZED (CLOSED) | NON-ENERGIZED (CLOSED) | ENERGIZED (OPENED) | ENERGIZED (OPENED) | |
| SOLENOID VALVE FOR DEHUMIDIFYING (22) | NON-ENERGIZED (CLOSED) | NON-ENERGIZED (CLOSED) | ENERGIZED (OPENED) | ENERGIZED (OPENED) | NON-ENERGIZED (CLOSED) | |
| EVAPORATION PRESSURE ADJUSTMENT VALVE (11) | NON-ENERGIZED (OPENED) | NON-ENERGIZED (OPENED) | NON-ENERGIZED (OPENED) | ENERGIZED (CLOSED)/ NON-ENERGIZED (OPENED) | NON-ENERGIZED (OPENED) | |
| OUTDOOR EXPANSION VALVE (6) | FULLY OPENED | LARGE BORE CONTROL | SHUT OFF | SMALL BORE CONTROL | DISCONNECTED | |

FIG. 15

| VALVE TYPE | OPERATION MODE | | | | |
|---|---|---|---|---|---|
| | COOLING | DEHUMIDIFYING AND COOLING | INTERNAL CYCLE | DEHUMIDIFYING AND HEATING | HEATING |
| SOLENOID VALVE FOR COOLING (17) | NON-ENERGIZED (OPENED) | NON-ENERGIZED (OPENED) | NON-ENERGIZED (OPENED) | ENERGIZED (CLOSED) | DISCONNECTED |
| SOLENOID VALVE FOR HEATING (21) | NON-ENERGIZED (CLOSED) | NON-ENERGIZED (CLOSED) | NON-ENERGIZED (CLOSED) | ENERGIZED (OPENED) | ENERGIZED (OPENED) |
| SOLENOID VALVE FOR DEHUMIDIFYING (22) | NON-ENERGIZED (CLOSED) | NON-ENERGIZED (CLOSED) | ENERGIZED (OPENED) | ENERGIZED (OPENED) | NON-ENERGIZED (CLOSED) |
| EVAPORATION PRESSURE ADJUSTMENT VALVE (11) | NON-ENERGIZED (OPENED) | NON-ENERGIZED (OPENED) | NON-ENERGIZED (OPENED) | ENERGIZED (CLOSED)/ NON-ENERGIZED (OPENED) | NON-ENERGIZED (OPENED) |
| OUTDOOR EXPANSION VALVE (6) | FULLY OPENED | LARGE BORE CONTROL | SHUT OFF | SMALL BORE CONTROL | SMALL BORE CONTROL |

FIG. 16

| VALVE TYPE | COOLING | DEHUMIDIFYING AND COOLING | INTERNAL CYCLE | DEHUMIDIFYING AND HEATING | HEATING |
|---|---|---|---|---|---|
| SOLENOID VALVE FOR COOLING (17) | NON-ENERGIZED (OPENED) | NON-ENERGIZED (OPENED) | NON-ENERGIZED (OPENED) | DISCONNECTED | ENERGIZED (CLOSED) |
| SOLENOID VALVE FOR HEATING (21) | NON-ENERGIZED (CLOSED) | NON-ENERGIZED (CLOSED) | NON-ENERGIZED (CLOSED) | ENERGIZED (OPENED) | ENERGIZED (OPENED) |
| SOLENOID VALVE FOR DEHUMIDIFYING (22) | NON-ENERGIZED (CLOSED) | NON-ENERGIZED (CLOSED) | ENERGIZED (OPENED) | ENERGIZED (OPENED) | NON-ENERGIZED (CLOSED) |
| EVAPORATION PRESSURE ADJUSTMENT VALVE (11) | NON-ENERGIZED (OPENED) | NON-ENERGIZED (OPENED) | NON-ENERGIZED (OPENED) | ENERGIZED (CLOSED)/ NON-ENERGIZED (OPENED) | NON-ENERGIZED (OPENED) |
| OUTDOOR EXPANSION VALVE (6) | FULLY OPENED | LARGE BORE CONTROL | SHUT OFF | SMALL BORE CONTROL | SMALL BORE CONTROL |

OPERATION MODE

FIG. 18

| VALVE TYPE | OPERATION MODE | | | | |
|---|---|---|---|---|---|
| | COOLING | DEHUMIDIFYING AND COOLING | INTERNAL CYCLE | DEHUMIDIFYING AND HEATING | HEATING |
| SOLENOID VALVE FOR COOLING (17) | NON-ENERGIZED (OPENED) | NON-ENERGIZED (OPENED) | NON-ENERGIZED (OPENED) | ENERGIZED (CLOSED) | ENERGIZED (CLOSED) |
| SOLENOID VALVE FOR HEATING (21) | NON-ENERGIZED (CLOSED) | NON-ENERGIZED (CLOSED) | NON-ENERGIZED (CLOSED) | ADHERED | ENERGIZED (OPENED) |
| SOLENOID VALVE FOR DEHUMIDIFYING (22) | NON-ENERGIZED (CLOSED) | NON-ENERGIZED (CLOSED) | ENERGIZED (OPENED) | ENERGIZED (OPENED) | NON-ENERGIZED (CLOSED) |
| EVAPORATION PRESSURE ADJUSTMENT VALVE (11) | NON-ENERGIZED (OPENED) | NON-ENERGIZED (OPENED) | NON-ENERGIZED (OPENED) | ENERGIZED (CLOSED)/ NON-ENERGIZED (OPENED) | NON-ENERGIZED (OPENED) |
| OUTDOOR EXPANSION VALVE (6) | FULLY OPENED | LARGE BORE CONTROL | SHUT OFF | SMALL BORE CONTROL | SMALL BORE CONTROL |

VEHICLE AIR CONDITIONER DEVICE

CROSS-REFERENCE TO RELATED APPLICATIONS

This application is a U.S. National Stage Patent Application under 37 U.S.C. § 371 of International Patent Application No. PCT/JP2015/083695, filed Dec. 1, 2015, which claims the benefit of Japanese Patent Application No. JP 2014-245739, filed Dec. 4, 2014, the disclosures of each of which are incorporated herein by reference in their entirety.

TECHNICAL FIELD

The present invention relates to an air conditioner device of a heat pump system which conditions air in a vehicle interior.

BACKGROUND ART

Due to actualization of environmental problems in recent years, hybrid cars and electric cars have spread. Further, as an air conditioner device which is applicable to such a vehicle, there has been developed an air conditioner device which includes an electric compressor to compress and discharge a refrigerant, a radiator (a condenser) disposed on a vehicle interior side to let the refrigerant radiate heat, a heat absorber (an evaporator) disposed on the vehicle interior side to let the refrigerant absorb heat, and an outdoor heat exchanger disposed outside a vehicle interior to let the refrigerant radiate or absorb heat, and which changes and executes respective operation modes of a heating mode to let the refrigerant discharged from the compressor radiate heat in the radiator and let the refrigerant by which heat has been radiated in this radiator absorb heat in the outdoor heat exchanger, a dehumidifying mode to let the refrigerant discharged from the compressor radiate heat in the radiator and let the refrigerant by which heat has been radiated in the radiator absorb heat in the heat absorber, and a cooling mode to let the refrigerant discharged from the compressor radiate heat in the outdoor heat exchanger and let the refrigerant absorb heat in the heat absorber.

Furthermore, a plurality of solenoid valves are used, and a coil of each solenoid valve is energized or non-energized to change an opened/closed state in each of the operation modes, thereby controlling the flow of the refrigerant in each operation mode (e.g., see Patent Document 1).

CITATION LIST

Patent Documents

Patent Document 1: Japanese Patent Application Publication No. 2014-51283

SUMMARY OF THE INVENTION

Problems to be Solved by the Invention

However, in a case where a failure such as disconnection or adherence occurs in one of coils of solenoid valves, a flow of a refrigerant becomes uncontrollable. Such a failure of the solenoid valve is detectable with a controller, and hence an air conditioner device has heretofore become inoperable in a case where the controller detects this failure.

The present invention has been developed to solve such a conventional technical problem, and an object thereof is to provide a vehicle air conditioner device which is capable of continuing air conditioning of a vehicle interior also in a case where a failure occurs in a solenoid valve to change a flow of a refrigerant in each operation mode.

Means for Solving the Problems

A vehicle air conditioner device of the present invention includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant radiate or absorb heat, a plurality of solenoid valves to change a flow of the refrigerant of a refrigerant circuit, auxiliary heating means for heating the air to be supplied from the air flow passage to the vehicle interior, and control means for controlling the compressor, the solenoid valves and the auxiliary heating means, the vehicle air conditioner device controls the solenoid valves by this control means to change the flow of the refrigerant, thereby executing one of a heating mode in which the control means lets the refrigerant discharged from the compressor radiate heat in the radiator, decompresses the refrigerant by which heat has been radiated, and then lets the refrigerant absorb heat in the outdoor heat exchanger, a dehumidifying mode in which the control means lets the refrigerant discharged from the compressor radiate heat in the radiator, decompresses the refrigerant by which heat has been radiated, and then lets the refrigerant absorb heat in the heat absorber, and a cooling mode in which the control means lets the refrigerant discharged from the compressor radiate heat in the outdoor heat exchanger, decompresses the refrigerant by which heat has been radiated, and then lets the refrigerant absorb heat in the heat absorber, and the vehicle air conditioner device is characterized in that the control means has a predetermined air conditioning mode during failure, and failure detecting means for detecting failures of the solenoid valves, and in a case where the failure detecting means detects that the solenoid valve fails in the respective operation modes, the control means selects the air conditioning mode during failure in which vehicle interior air conditioning by the operation mode is achievable, to continue the air conditioning of the vehicle interior.

The vehicle air conditioner device of the invention of claim 2 is characterized in that in the above invention, the dehumidifying mode includes a dehumidifying and heating mode in which the control means lets the refrigerant discharged from the compressor radiate heat in the radiator, decompresses the refrigerant by which heat has been radiated, and then lets the refrigerant absorb heat in the heat absorber and the outdoor heat exchanger, and a dehumidifying and cooling mode in which the control means lets the refrigerant discharged from the compressor radiate heat in the radiator and the outdoor heat exchanger, decompresses the refrigerant by which heat has been radiated, and then lets the refrigerant absorb heat in the heat absorber, and the control means changes the flow of the refrigerant to the other operation mode that more enables dehumidifying of the vehicle interior to obtain the air conditioning mode during failure, in a case of detecting that the solenoid valve fails in the dehumidifying and heating mode or the dehumidifying and cooling mode.

The vehicle air conditioner device of the invention of claim 3 is characterized in that in the above invention, the vehicle air conditioner device executes the air conditioning mode during failure in which the control means changes the flow of the refrigerant to the operation mode in which the vehicle interior can be more cooled, and performs the heating by the auxiliary heating means as required, in a case of detecting that the solenoid valve fails in the dehumidifying and heating mode.

The vehicle air conditioner device of the invention of claim 4 is characterized in that in the invention of claim 2 or claim 3, the vehicle air conditioner device includes the solenoid valve for heating which is energized to open in the heating mode and the dehumidifying and heating mode, and executes the air conditioning mode during failure in which the control means changes the flow of the refrigerant to the dehumidifying and cooling mode, and performs the heating by the auxiliary heating means when the heat radiation by the radiator runs short, in a case of detecting that the solenoid valve for heating fails in the dehumidifying and heating mode.

The vehicle air conditioner device of the invention of claim 5 is characterized in that in the inventions of claim 2 to claim 4, the vehicle air conditioner device includes the solenoid valve for dehumidifying which is connected in parallel with the outdoor heat exchanger and energized to open in the dehumidifying and heating mode, and executes the air conditioning mode during failure in which the control means changes the flow of the refrigerant to the dehumidifying and cooling mode, and performs the heating by the auxiliary heating means when the heat radiation by the radiator runs short, in a case of detecting that the solenoid valve for dehumidifying fails in the dehumidifying and heating mode.

The vehicle air conditioner device of the invention of claim 6 is characterized in that in the inventions of claim 2 to claim 5, the dehumidifying mode includes an internal cycle mode in which the control means lets the refrigerant discharged from the compressor radiate heat in the radiator, decompresses the refrigerant by which heat has been radiated, and then lets the refrigerant absorb heat in the heat absorber, and the vehicle air conditioner device includes the solenoid valve for dehumidifying which is connected in parallel with the outdoor heat exchanger and energized to open in the internal cycle mode, and executes the air conditioning mode during failure in which the control means changes the flow of the refrigerant to the dehumidifying and cooling mode, and performs the heating by the auxiliary heating means when the heat radiation by the radiator runs short, in a case of detecting that the solenoid valve for dehumidifying fails in the internal cycle mode.

The vehicle air conditioner device of the invention of claim 7 is characterized in that in the inventions of claim 2 to claim 6, the vehicle air conditioner device includes an evaporation pressure adjustment valve which is connected to a refrigerant outlet side of the heat absorber and opened/closed in the dehumidifying and heating mode, the failure detecting means also detects a failure of the evaporation pressure adjustment valve, and vehicle air conditioner device executes the air conditioning mode during failure in which the control means changes the flow of the refrigerant to the dehumidifying and cooling mode, and performs the heating by the auxiliary heating means when the heat radiation by the radiator runs short, in a case of detecting that the evaporation pressure adjustment valve fails in the dehumidifying and heating mode.

The vehicle air conditioner device of the invention of claim 8 is characterized in that in the above respective inventions, the vehicle air conditioner device includes an air mix damper to adjust a ratio at which the air in the air flow passage passed through the heat absorber is passed through the radiator, and an outdoor expansion valve which throttles and decompresses the refrigerant flowing into the outdoor heat exchanger, the dehumidifying mode includes a dehumidifying and heating mode in which the control means lets the refrigerant discharged from the compressor radiate heat in the radiator, decompresses the refrigerant by which heat has been radiated, and then lets the refrigerant absorb heat in the heat absorber and the outdoor heat exchanger, and in this dehumidifying and heating mode, the control means controls a temperature of the heat absorber by a valve position of the outdoor expansion valve, and controls a temperature of the air passed through the radiator by a number of revolution of the compressor, and the failure detecting means also detects a failure of the outdoor expansion valve, and the vehicle air conditioner device executes the air conditioning mode during failure in which the control means controls the temperature of the heat absorber by the compressor, and controls a temperature of the air to be blown out to the vehicle interior by the air mix damper and the auxiliary heating means, without changing the flow of the refrigerant, in a case of detecting that the outdoor expansion valve fails in the dehumidifying and heating mode.

The vehicle air conditioner device of the invention of claim 9 is characterized in that in the above respective inventions, the vehicle air conditioner device includes an air mix damper to adjust a ratio at which the air in the air flow passage passed through the heat absorber is passed through the radiator, and an outdoor expansion valve which throttles and decompresses the refrigerant flowing into the outdoor heat exchanger, the dehumidifying mode includes a dehumidifying and cooling mode in which the control means lets the refrigerant discharged from the compressor radiate heat in the radiator and the outdoor heat exchanger, decompresses the refrigerant by which heat has been radiated, and then lets the refrigerant absorb heat in the heat absorber, and in this dehumidifying and cooling mode, the control means controls a temperature of the air passed through the radiator by a valve position of the outdoor expansion valve, and the failure detecting means also detects a failure of the outdoor expansion valve, and the vehicle air conditioner device executes the air conditioning mode during failure in which the control means controls a temperature of the air to be blown out to the vehicle interior by the air mix damper and the auxiliary heating means without changing the flow of the refrigerant, in a case of detecting that the outdoor expansion valve fails in the dehumidifying and cooling mode.

The vehicle air conditioner device of the invention of claim 10 is characterized in that in the above respective inventions, the vehicle air conditioner device includes the solenoid valve for heating which is energized to open in the heating mode, and executes the air conditioning mode during failure in which the control means stops an operation of the compressor and performs the heating by the auxiliary heating means, in a case of detecting that the solenoid valve for heating fails in the heating mode.

The vehicle air conditioner device of the invention of claim 11 is characterized in that in the above respective inventions, the vehicle air conditioner device includes an outdoor expansion valve which throttles and decompresses the refrigerant flowing into the outdoor heat exchanger, and an evaporation pressure adjustment valve which is connected to a refrigerant outlet side of the heat absorber and opened/closed in the dehumidifying and heating mode, the failure detecting means also detects failures of the outdoor expansion valve and the evaporation pressure adjustment valve, and the vehicle air conditioner device executes the air conditioning mode during failure in which the control means continues each operation mode without changing the flow of the refrigerant when the vehicle interior air conditioning is achievable in the operation mode, also in a case of detecting the failure of one of the solenoid valve, the outdoor expansion valve and the evaporation pressure adjustment valve in the operation mode.

The vehicle air conditioner device of the invention of claim 12 is characterized in that in the above respective inventions, the vehicle air conditioner device includes an outdoor expansion valve which throttles and decompresses the refrigerant flowing into the outdoor heat exchanger, and an evaporation pressure adjustment valve which is connected to a refrigerant outlet side of the heat absorber and opened/closed in the dehumidifying and heating mode, and the failure detecting means detects the failures of the solenoid valve, the outdoor expansion valve and the evaporation pressure adjustment valve electrically or in accordance with a situation of a temperature and/or a pressure of the refrigerant circuit.

The vehicle air conditioner device of the invention of claim 13 is characterized in that in the above respective inventions, the vehicle air conditioner device includes a heating medium circulating circuit which has a heating medium-air heat exchanger, an electric heater and circulating means, and circulates a heating medium heated by the electric heater through the heating medium-air heat exchanger by the circulating means, and the heating medium-air heat exchanger constitutes the auxiliary heating means.

The vehicle air conditioner device of the invention of claim 14 is characterized in that in the inventions of claim 1 to claim 12, the auxiliary heating means is constituted of an electric heater which heats the air to be supplied from the air flow passage to the vehicle interior.

Advantageous Effect of the Invention

According to the present invention, a vehicle air conditioner device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant radiate or absorb heat, a plurality of solenoid valves to change a flow of the refrigerant of a refrigerant circuit, auxiliary heating means for heating the air to be supplied from the air flow passage to the vehicle interior, and control means for controlling the compressor, the solenoid valves and the auxiliary heating means, and the vehicle air conditioner device controls the solenoid valves by this control means to change the flow of the refrigerant, thereby executing one of a heating mode in which the control means lets the refrigerant discharged from the compressor radiate heat in the radiator, decompresses the refrigerant by which heat has been radiated, and then lets the refrigerant absorb heat in the outdoor heat exchanger, a dehumidifying mode in which the control means lets the refrigerant discharged from the compressor radiate heat in the radiator, decompresses the refrigerant by which heat has been radiated, and then lets the refrigerant absorb heat in the heat absorber, and a cooling mode in which the control means lets the refrigerant discharged from the compressor radiate heat in the outdoor heat exchanger, decompresses the refrigerant by which heat has been radiated, and then lets the refrigerant absorb heat in the heat absorber. In the vehicle air conditioner device, the control means has a predetermined air conditioning mode during failure, and failure detecting means for detecting failure of the solenoid valve, and in a case where the failure detecting means detects that the solenoid valve fails in the respective operation modes, the control means selects the air conditioning mode during failure in which vehicle interior air conditioning by the operation mode is achievable, to continue the air conditioning of the vehicle interior. Therefore, also in a case where as in the invention of claim 12, the failure detecting means detects that the solenoid valve of the refrigerant circuit fails electrically or in accordance with a situation of a temperature or a pressure of the refrigerant circuit and the vehicle air conditioner device falls in a situation in which the operation mode which is currently being executed cannot continue, the vehicle air conditioner device continues the air conditioning of the vehicle interior in the air conditioning mode during failure in which the vehicle interior air conditioning by the operation mode is achievable, and it is possible to prevent or inhibit the disadvantage that comfort of the vehicle interior is impaired.

For example, as in the invention of claim 2, when the dehumidifying mode includes a dehumidifying and heating mode in which the control means lets the refrigerant discharged from the compressor radiate heat in the radiator, decompresses the refrigerant by which heat has been radiated, and then lets the refrigerant absorb heat in the heat absorber and the outdoor heat exchanger, and a dehumidifying and cooling mode in which the control means lets the refrigerant discharged from the compressor radiate heat in the radiator and the outdoor heat exchanger, decompresses the refrigerant by which heat has been radiated, and then lets the refrigerant absorb heat in the heat absorber, and the control means changes the flow of the refrigerant to the other operation mode that more enables dehumidifying of the vehicle interior to obtain the air conditioning mode during failure, in a case where the failure detecting means detects that the solenoid valve fails in the dehumidifying and heating mode or the dehumidifying and cooling mode. Consequently, it is possible to secure the dehumidifying of the vehicle interior, and it is possible to avoid in advance a disadvantage such as generation of fog on a window glass of a vehicle, thereby acquiring safe running.

In this case, as in the invention of claim 3, the vehicle air conditioner device executes the air conditioning mode during failure in which the control means changes the flow of the refrigerant to the operation mode in which the vehicle interior can be more cooled, and performs the heating by the auxiliary heating means as required, in the case where the failure detecting means detects that the solenoid valve fails in the dehumidifying and heating mode. Consequently, it is possible to eliminate temperature drop of the vehicle interior, thereby achieving comfortable air conditioning, while securing the dehumidifying of the vehicle interior.

For example, as in the invention of claim 4, the vehicle air conditioner device executes the air conditioning mode during failure in which the control means changes the flow of the refrigerant to the dehumidifying and cooling mode, and performs the heating by the auxiliary heating means when the heat radiation by the radiator runs short, in a case where the failure detecting means detects that a solenoid valve for heating energized to open in the heating mode and the dehumidifying and heating mode fails. In this case, it is possible to stably continue comfortable dehumidifying and temperature control of the vehicle interior, while avoiding the disadvantage that the failure of the solenoid valve for heating causes damage to the compressor.

Furthermore, for example, as in the invention of claim 5, the vehicle air conditioner device executes the air conditioning mode during failure in which the control means changes the flow of the refrigerant to the dehumidifying and cooling mode, and performs the heating by the auxiliary heating means when the heat radiation by the radiator runs short, in a case of detecting that a solenoid valve for dehumidifying connected in parallel with the outdoor heat exchanger and energized to open in the dehumidifying and heating mode fails in the dehumidifying and heating mode. Consequently, it is similarly possible to stably continue comfortable dehumidifying and temperature control of the vehicle interior.

Furthermore, for example, as in the invention of claim 6, when the dehumidifying mode includes an internal cycle mode in which the control means lets the refrigerant discharged from the compressor radiate heat in the radiator, decompresses the refrigerant by which heat has been radiated, and then lets the refrigerant absorb heat in the heat absorber, the vehicle air conditioner device executes the air conditioning mode during failure in which the control means changes the flow of the refrigerant to the dehumidifying and cooling mode, and performs the heating by the auxiliary heating means when the heat radiation by the radiator runs short, in a case of detecting that the solenoid valve for dehumidifying connected in parallel with the outdoor heat exchanger and energized to open in the internal cycle mode fails in the internal cycle mode. Consequently, it is similarly possible to stably continue comfortable dehumidifying and temperature control of the vehicle interior, while avoiding the disadvantage that the failure of the solenoid valve for dehumidifying causes damage to the compressor.

Furthermore, for example, as in the invention of claim 7, the failure detecting means also detects a failure of an evaporation pressure adjustment valve, and the vehicle air conditioner device executes the air conditioning mode during failure in which the control means changes the flow of the refrigerant to the dehumidifying and cooling mode, and performs the heating by the auxiliary heating means when the heat radiation by the radiator runs short, in a case where the evaporation pressure adjustment valve connected to a refrigerant outlet side of the heat absorber and opened/closed in the dehumidifying and heating mode fails in the dehumidifying and heating mode. Consequently, it is possible to stably continue comfortable dehumidifying and temperature control of the vehicle interior, while avoiding freezing of the heat absorber.

Furthermore, as in the invention of claim 8, the vehicle air conditioner device includes an air mix damper to adjust a ratio at which the air in the air flow passage passed through the heat absorber is passed through the radiator, and an outdoor expansion valve which throttles and decompresses the refrigerant flowing into the outdoor heat exchanger, the dehumidifying mode includes a dehumidifying and heating mode in which the control means lets the refrigerant discharged from the compressor radiate heat in the radiator, decompresses the refrigerant by which heat has been radiated, and then lets the refrigerant absorb heat in the heat absorber and the outdoor heat exchanger, and in this dehumidifying and heating mode, the control means controls a temperature of the heat absorber by a valve position of the outdoor expansion valve, and controls a temperature of the air passed through the radiator by a number of revolution of the compressor. In this case, when the outdoor expansion valve fails, the temperature of the heat absorber is not controllable.

In such a case, the vehicle air conditioner device executes the air conditioning mode during failure in which the control means controls the temperature of the heat absorber by the compressor without changing the flow of the refrigerant, and controls a temperature of the air to be blown out to the vehicle interior by the air mix damper and the auxiliary heating means, in a case where the failure detecting means detects that the outdoor expansion valve fails in the dehumidifying and heating mode. Consequently, it is possible to continuously control both of the temperature of the heat absorber and the temperature of the air to be blown out to the vehicle interior without any hindrance, and it is possible to continue comfortable air conditioning of the vehicle interior.

Furthermore, as in the invention of claim 9, the vehicle air conditioner device includes an air mix damper to adjust a ratio at which the air in the air flow passage passed through the heat absorber is passed through the radiator, and an outdoor expansion valve which throttles and decompresses the refrigerant flowing into the outdoor heat exchanger, the dehumidifying mode includes a dehumidifying and cooling mode in which the control means lets the refrigerant discharged from the compressor radiate heat in the radiator and the outdoor heat exchanger, decompresses the refrigerant by which heat has been radiated, and then lets the refrigerant absorb heat in the heat absorber, and in this dehumidifying and cooling mode, the temperature of the air to be blown out to the vehicle interior is not controllable, in a case where the outdoor expansion valve fails when the control means controls the temperature of the air passed through the radiator by a valve position of the outdoor expansion valve.

In such a case, the vehicle air conditioner device executes the air conditioning mode during failure in which the control means controls the temperature of the air to be blown out to the vehicle interior by the air mix damper and the auxiliary heating means without changing the flow of the refrigerant, in a case where the failure detecting means detects that the outdoor expansion valve fails in the dehumidifying and cooling mode. Consequently, it is possible to continuously control the temperature of the air to be blown out to the vehicle interior without any hindrance, and it is possible to continue comfortable air conditioning of the vehicle interior.

It is to be noted that as in the invention of claim 10, in a case where the solenoid valve for heating which is energized to open in the heating mode fails in the heating mode, there is the risk that the refrigerant circuit is not established. In such a case, the vehicle air conditioner device executes the air conditioning mode during failure in which the control means stops an operation of the compressor and performs the heating by the auxiliary heating means. Consequently, it is possible to continue the heating of the vehicle interior by the auxiliary heating means, while avoiding the disadvantage that the failure of the solenoid valve for heating causes damage to the compressor.

Furthermore, as in the invention of claim 11, the vehicle air conditioner device may execute the air conditioning mode during failure in which the control means continues each operation mode without changing the flow of the refrigerant when the vehicle interior air conditioning is achievable in the operation mode, also in a case where the failure detecting means detects the failure of one of the solenoid valve, the outdoor expansion valve and the evaporation pressure adjustment valve in the operation mode.

In these inventions, as in the invention of claim 13, the vehicle air conditioner device includes a heating medium circulating circuit which has a heating medium-air heat exchanger, an electric heater and circulating means, and circulates a heating medium heated by the electric heater through the heating medium-air heat exchanger by the circulating means, and the heating medium-air heat exchanger constitutes the auxiliary heating means. Consequently, it is possible to achieve electrically safe vehicle interior heating.

However, the auxiliary heating means may be an electric heater which heats the air to be supplied from the air flow passage to the vehicle interior as in the invention of claim 14. Consequently, it is possible to constitute the auxiliary heating means with a comparatively simple structure.

BRIEF DESCRIPTION OF THE DRAWINGS

FIG. 3 is a view to explain opening/closing and energized states of solenoid valves and an evaporation pressure adjustment valve and a state of an outdoor expansion valve in respective operation modes of the vehicle air conditioner device of FIG. 1;

FIG. 4 is a view to explain one example of an electric failure detecting method in the present invention;

FIG. 7 is a view to explain an operation of the controller of FIG. 2 when a solenoid valve for heating is disconnected in a dehumidifying and heating mode;

FIG. 8 is a view to explain an operation of the controller of FIG. 2 when a solenoid valve for dehumidifying is disconnected in the dehumidifying and heating mode;

FIG. 9 is a view to explain an operation of the controller of FIG. 2 when the solenoid valve for dehumidifying is disconnected in an internal cycle mode;

FIG. 10 is a view to explain an operation of the controller of FIG. 2 when the evaporation pressure adjustment valve is disconnected in the dehumidifying and heating mode;

FIG. 11 is a view to explain an operation of the controller of FIG. 2 when the outdoor expansion valve is disconnected in the dehumidifying and heating mode;

FIG. 12 is a view to explain an operation of the controller of FIG. 2 when the outdoor expansion valve is disconnected in a dehumidifying and cooling mode;

FIG. 13 is a view to explain an operation of the controller of FIG. 2 when the solenoid valve for heating is disconnected in a heating mode, FIG. 14 is a view to explain an operation of the controller of FIG. 2 when the outdoor expansion valve is disconnected in the heating mode;

FIG. 15 is a view to explain an operation of the controller of FIG. 2 when a solenoid valve for cooling is disconnected in the heating mode;

FIG. 16 is a view to explain an operation of the controller of FIG. 2 when the solenoid valve for cooling is disconnected in the dehumidifying and heating mode;

FIG. 18 is a view to explain an operation of the controller of FIG. 2 when the solenoid valve for heating is adhered in the dehumidifying and heating mode.

MODE FOR CARRYING OUT THE INVENTION

Hereinafter, embodiments of the present invention will be described in detail with reference to the drawings.

Figure 1:
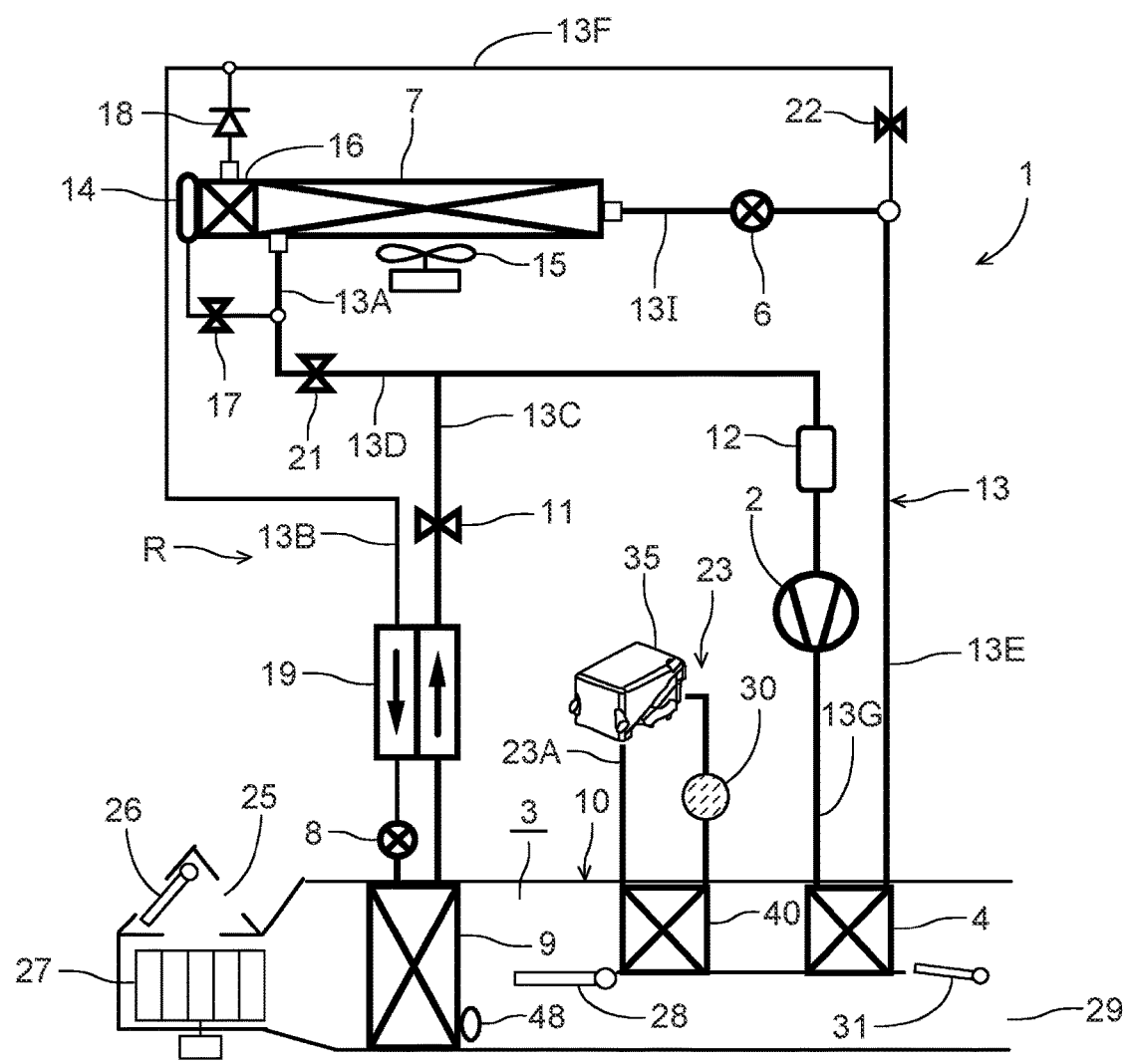
FIG. 1 is a constitutional view of a vehicle air conditioner device of one embodiment to which the present invention is applied.

FIG. 1 shows a constitutional view of a vehicle air conditioner device 1 of one embodiment of the present invention. A vehicle of the embodiment to which the present invention is applied is an electric car (EV) in which an engine (an internal combustion engine) is not mounted and which runs by driving an electric motor for running with power charged in a battery (which is not shown in the drawing), and the vehicle air conditioner device 1 of the present invention is also driven with the power of the battery. That is, the vehicle air conditioner device 1 of the embodiment performs heating by a heat pump operation using a refrigerant circuit in the electric car in which it is not possible to perform heating by engine waste heat, and further, the vehicle air conditioner device selectively executes respective operation modes of dehumidifying and heating, an internal cycle, dehumidifying and cooling, and cooling.

It is to be noted that the vehicle is not limited to the electric car, and the present invention is also effective for a so-called hybrid car using the engine together with the electric motor for running, and furthermore, needless to say, the present invention is also applicable to a usual car which runs with the engine.

The vehicle air conditioner device 1 of the embodiment performs air conditioning (heating, cooling, dehumidifying, and ventilation) of a vehicle interior of the electric car, and there are successively connected, by a refrigerant pipe 13, an electric type of compressor 2 which compresses a refrigerant, a radiator 4 disposed in an air flow passage 3 of an HVAC unit 10 in which vehicle interior air passes and circulates, to let the high-temperature high-pressure refrigerant discharged from the compressor 2 flow inside via a refrigerant pipe 13G and to let this refrigerant radiate heat in the vehicle interior, an outdoor expansion valve 6 constituted of an electric valve (an electronic expansion valve) which throttles, decompresses and expands the refrigerant during the heating, an outdoor heat exchanger 7 which performs heat exchange between the refrigerant and outdoor air to function as the radiator during the cooling and to function as an evaporator during the heating, an indoor expansion valve 8 constituted of an electric valve which throttles, decompresses and expands the refrigerant, a heat absorber 9 disposed in the air flow passage 3 to let the refrigerant absorb heat from interior and exterior of the vehicle during the cooling and during the dehumidifying, an evaporation pressure adjustment valve 11 which is connected to a refrigerant outlet side of the heat absorber 9 to adjust an evaporation pressure in the heat absorber 9, an accumulator 12 and the like, thereby constituting a refrigerant circuit R.

It is to be noted that in the outdoor heat exchanger 7, an outdoor blower 15 is disposed. The outdoor blower 15 is constituted to forcibly blow the outdoor air through the outdoor heat exchanger 7, thereby performing heat exchange between the outdoor air and the refrigerant, and consequently, the outdoor blower blows the outdoor air through the outdoor heat exchanger 7 also during stop (i.e., a velocity is 0 km/h).

Furthermore, the outdoor heat exchanger 7 has a receiver drier portion 14 and a subcooling portion 16 successively on a refrigerant downstream side, a refrigerant pipe 13A extending out from the outdoor heat exchanger 7 is connected to the receiver drier portion 14 via a solenoid valve (a solenoid valve for cooling) 17 opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

Furthermore, a refrigerant pipe 13B between the check valve 18 and the indoor expansion valve 8 is disposed in a heat exchange relation with a refrigerant pipe 13C on an upstream side of the evaporation pressure adjustment valve 11 positioned on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9 toward the evaporation pressure adjustment valve 11.

Furthermore, the refrigerant pipe 13A extending out from the outdoor heat exchanger 7 branches, and this branching refrigerant pipe 13D communicates and connects with the refrigerant pipe 13C on a downstream side of the evaporation pressure adjustment valve 11 via a solenoid valve 21 (a solenoid valve for heating) to be opened during the heating. The refrigerant pipe 13C is connected to the accumulator 12 and the accumulator 12 is connected to a refrigerant suction side of the compressor 2. That is, the solenoid valve 21 for heating is positioned between an outlet of the outdoor heat exchanger 7 (in a heating, dehumidifying and heating, or internal cycle mode) and an inlet of the accumulator 12.

Furthermore, a refrigerant pipe 13E on an outlet side of the radiator 4 branches before the outdoor expansion valve 6, and this branching refrigerant pipe 13F communicates and connects with the refrigerant pipe 13B on a downstream side of the check valve 18 via a solenoid valve (a solenoid valve for dehumidifying) 22 to be opened during the dehumidifying. That is, the solenoid valve 22 for dehumidifying is connected in parallel with the outdoor heat exchanger 7 (and the outdoor expansion valve 6, etc.). It is to be noted that a pipe between the outdoor expansion valve 6 and the outdoor heat exchanger 7 is denoted with 13I.

Furthermore, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor air or outdoor air to the air flow passage 3.

Furthermore, in FIG. 1, reference numeral 23 indicates a heating medium circulating circuit disposed in the vehicle air conditioner device 1 of the embodiment. The heating medium circulating circuit 23 includes a circulating pump 30 constituting circulating means, a heating medium heating electric heater 35, and a heating medium-air heat exchanger 40 (auxiliary heating means in the present invention) disposed in the air flow passage 3 on an air upstream side of the radiator 4 to the flow of the air of the air flow passage 3, and these components are successively annularly connected to one another by a heating medium pipe 23A. It is to be noted that as the heating medium to circulate in the heating medium circulating circuit 23, for example, water, a refrigerant such as HFO-1234yf, a coolant or the like is employed.

Further, when the circulating pump 30 is operated and the heating medium heating electric heater 35 is energized to generate heat, the heating medium heated by the heating medium heating electric heater 35 circulates through the heating medium-air heat exchanger 40. That is, the heating medium-air heat exchanger 40 of the heating medium circulating circuit 23 becomes a so-called heater core, and complements the heating of the vehicle interior. The employing of the heating medium circulating circuit 23 can improve electric safety of a passenger.

Furthermore, in the air flow passage 3 on the air upstream side of the heating medium-air heat exchanger 40, an air mix damper 28 is disposed to adjust a degree at which indoor air or outdoor air is passed through the radiator 4. Furthermore, in the air flow passage 3 on the air downstream side of the radiator 4, there is formed each outlet (represented by an outlet 29 in FIG. 1) of foot, vent or defroster, and in the outlet 29, an outlet changing damper 31 is disposed to execute changing control of blowing of the air from each outlet mentioned above.

Figure 2:
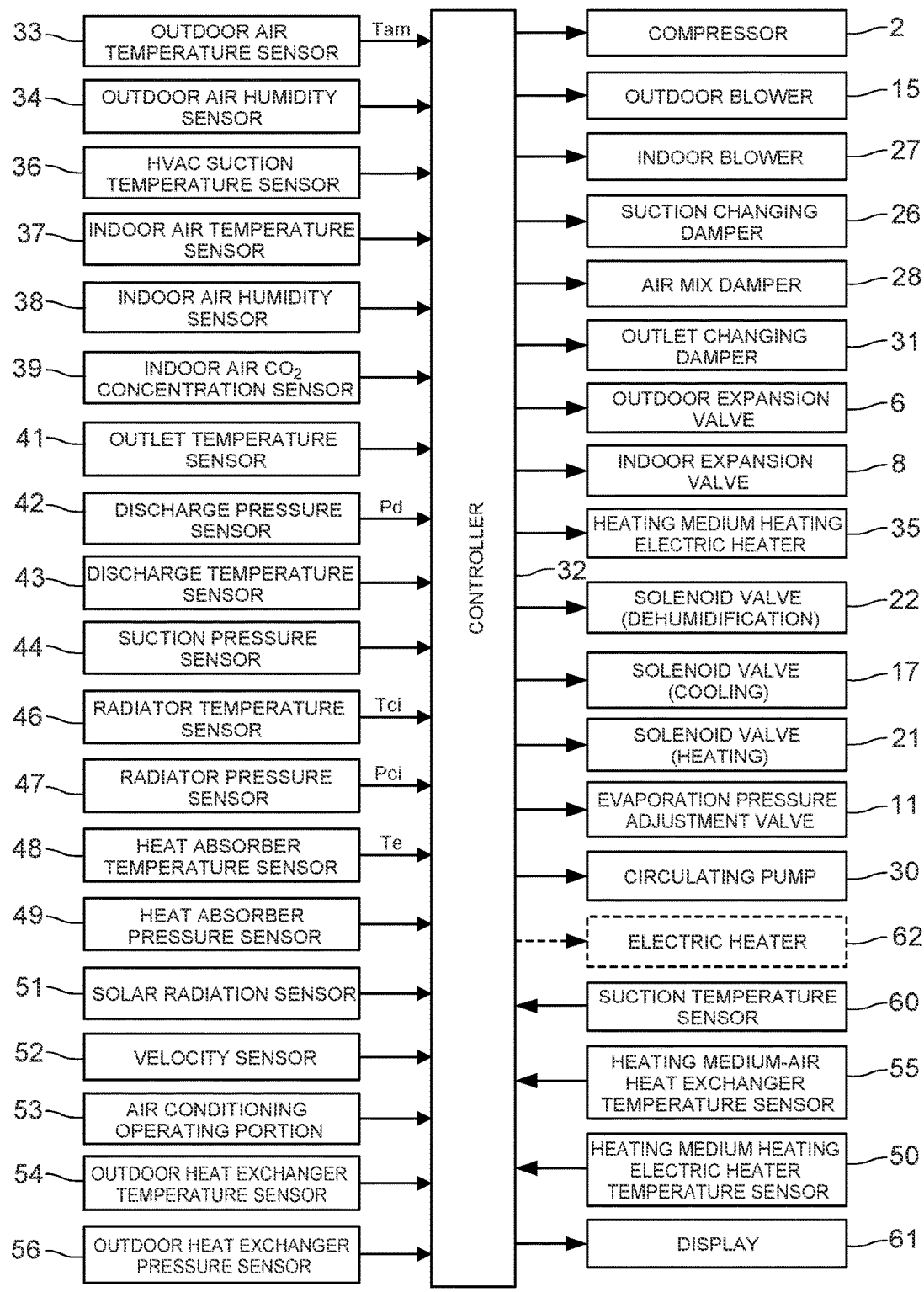
FIG. 2 is a block diagram of an electric circuit of a controller of the vehicle air conditioner device of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air blown out from the outlet 29 to the vehicle interior, a discharge pressure sensor 42 which detects a pressure Pd of the refrigerant discharged from the compressor 2, a discharge temperature sensor 43 which detects a temperature Td of the refrigerant discharged from the compressor 2, a suction pressure sensor 44 which detects a suction refrigerant pressure of the compressor 2, a suction temperature sensor 60 which detects a suction refrigerant temperature of the compressor 2, a radiator temperature sensor 46 which detects a temperature Tci of the radiator 4 (the temperature of the air passed through the radiator 4 in the embodiment), a radiator pressure sensor 47 which detects a radiator pressure Pci of the radiator 4 (the pressure in the radiator 4 or of the refrigerant which has just flowed out from the radiator 4), a heat absorber temperature sensor 48 which detects a temperature Te of the heat absorber 9 (the temperature of the air passed through the heat absorber 9 or the temperature of the heat absorber 9 itself), a heat absorber pressure sensor 49 which detects a refrigerant pressure of the heat absorber 9 (the pressure in the heat absorber 9 or of the refrigerant which has just flowed out from the heat absorber 9), a solar radiation sensor 51 of, e.g., a photo sensor system to detect a solar radiation amount into the vehicle, a velocity sensor 52 to detect a moving speed (a velocity) of the vehicle, an air conditioning operating portion 53 to set the changing of a predetermined temperature or the operation mode, an outdoor heat exchanger temperature sensor 54 which detects a temperature of the outdoor heat exchanger 7 (the temperature of the refrigerant which has just flowed out from the outdoor heat exchanger 7 or the temperature of the outdoor heat exchanger 7 itself), and an outdoor heat exchanger pressure sensor 56 which detects the refrigerant pressure of the outdoor heat exchanger 7 (the pressure in the outdoor heat exchanger 7 or of the refrigerant which has just flowed out from the outdoor heat exchanger 7).

Furthermore, the input of the controller 32 is further connected to respective outputs of a heating medium heating electric heater temperature sensor 50 which detects a temperature of the heating medium heating electric heater 35 of the heating medium circulating circuit 23 (the temperature of the heating medium which has just been heated by the heating medium heating electric heater 35, or the temperature of an unshown electric heater itself disposed in the heating medium heating electric heater 35), and a heating medium-air heat exchanger temperature sensor 55 which detects a temperature TH of the heating medium-air heat exchanger 40 (the temperature of the air flowing through the heating medium-air heat exchanger 40, or the temperature of the heating medium-air heat exchanger 40 itself).

On the other hand, an output of the controller 32 is connected to the compressor 2, the outdoor blower 15, the indoor blower (the blower fan) 27, the suction changing damper 26, the air mix damper 28, the outlet changing damper 31, the respective expansion valves of the outdoor expansion valve 6 and the indoor expansion valve 8, respective solenoid valves such as the solenoid valve 22 (for dehumidifying), the solenoid valve 17 (for cooling) and the solenoid valve 21 (for heating), the circulating pump 30, the heating medium heating electric heater 35, and the evaporation pressure adjustment valve 11. Then, the controller 32 controls these components on the basis of the outputs of the respective sensors and the setting input by the air conditioning operating portion 53. It is to be noted that reference numeral 61 is a display disposed in the air conditioning operating portion 53, and the display constitutes display means of various pieces of information on operations and running, and additionally constitutes alarm means for displaying information of failure such as disconnection/adhesion described later or the like.

Here, each of the respective solenoid valves 17, 21 and 22 mentioned above has a coil, and the coil is energized to control opening/closing, but the solenoid valve 17 for cooling is a so-called normally open type (NO) solenoid valve which closes when the coil is energized and opens when the coil is non-energized, and the solenoid valve 21 for heating and the solenoid valve 22 for dehumidifying are so-called normally closed type (NC) solenoid valves which open during the energization and close during the non-energization.

Consequently, in a state where a power source is disconnected as described later in detail, an annular refrigerant circuit (a cooling mode which will be described later) is constituted to communicate with the compressor 2 (a discharge side), the radiator 4, the outdoor expansion valve 6 (fully open), the outdoor heat exchanger 7, the solenoid valve 17 (for cooling), the receiver drier portion 14, the subcooling portion 16, the check valve 18, the internal heat exchanger 19, the indoor expansion valve 8, the heat absorber 9, the internal heat exchanger 19, the evaporation pressure adjustment valve 11, the accumulator 12, and the compressor 2 (a suction side).

Furthermore, the evaporation pressure adjustment valve 11 performs an operation to open during the non-energization and close during the energization, and is constituted so that the refrigerant slightly flows also during the energization, and hence this flow path is enlarged during the non-energization. On the other hand, the evaporation pressure adjustment valve 11 is energized to close when the temperature of the heat absorber 9 lowers, and is non-energized when the temperature rises, by the controller 32.

Next, an operation of the vehicle air conditioner device 1 of the embodiment having the above-mentioned constitution will be described. In the embodiment, the controller 32 has respective operation modes of a heating mode, a dehumidifying and heating mode, an internal cycle mode, a dehumidifying and cooling mode, and a cooling mode, and changes and executes these modes. Here, each of the dehumidifying and heating mode, the internal cycle mode and the dehumidifying and cooling mode is included in the dehumidifying mode of the present invention. Each of the dehumidifying and heating mode, the internal cycle mode, the dehumidifying and cooling mode and the cooling mode is an operation mode which enables dehumidifying of the vehicle interior. It is to be noted that the controller 32 has a plurality of types of air conditioning modes during failure as described later, in addition to these operation modes.

First, a flow of the refrigerant in each operation mode will be described with reference to FIG. 3 which explains an opened/closed state of each of the solenoid valves 17, 21 and 22.

(1) Flow of Refrigerant of Heating Mode

When the heating mode is selected by the controller 32 or a manual operation to the air conditioning operating portion 53, the controller 32 energizes the solenoid valve 21 for heating to open the solenoid valve 21 and energizes the solenoid valve 17 for cooling to close the solenoid valve 17. Furthermore, the controller adjusts the solenoid valve 22 for dehumidifying to be non-energized, and closes the solenoid valve 22.

Then, the controller operates the compressor 2 and the respective blowers 15 and 27, and the air mix damper 28 has a state of passing the air blown out from the indoor blower 27 through the heating medium-air heat exchanger 40 and the radiator 4. In consequence, a high-temperature high-pressure gas refrigerant discharged from the compressor 2 flows into the radiator 4. The air in the air flow passage 3 passes through the radiator 4, and hence the air in the air flow passage 3 heats by the high-temperature refrigerant in the radiator 4, whereas the refrigerant in the radiator 4 has the heat taken by the air and is cooled to condense and liquefy.

The refrigerant liquefied in the radiator 4 flows out from the radiator 4, and then flows through the refrigerant pipe 13E to reach the outdoor expansion valve 6. It is to be noted that an operation and a function of the heating medium circulating circuit 23 will be described later. The refrigerant flowing into the outdoor expansion valve 6 is decompressed therein and then flows into the outdoor heat exchanger 7. The refrigerant flowing into the outdoor heat exchanger 7 evaporates, and the heat is pumped up from the outdoor air passed by running or the outdoor blower 15. That is, the refrigerant circuit R becomes a heat pump. Then, the low-temperature refrigerant flowing out from the outdoor heat exchanger 7 flows through the refrigerant pipe 13A and the solenoid valve 21 and the refrigerant pipe 13D, and flows from the refrigerant pipe 13C into the accumulator 12 to perform gas liquid separation therein, and then the gas refrigerant is sucked into the compressor 2, thereby repeating this circulation. The air heated in the heating medium-air heat exchanger 40 or the radiator 4 is blown out from the outlet 29, thereby performing the heating of the vehicle interior.

The controller 32 controls a number of revolution of the compressor 2 on the basis of a high pressure side pressure of the refrigerant circuit R which is detected by the discharge pressure sensor 42 or the radiator pressure sensor 47, controls a temperature of the air passed through the radiator 4 (the temperature of the air heated in the radiator 4), also controls a valve position of the outdoor expansion valve 6 with a small bore (the valve position: small) on the basis of a temperature of the radiator 4 which is detected by the radiator temperature sensor 46 and the refrigerant pressure of the radiator 4 which is detected by the radiator pressure sensor 47, and controls a subcool degree of the refrigerant in an outlet of the radiator 4.

(1-1) Effects of Solenoid Valve 21 for Heating and Solenoid Valve 22 for Dehumidifying which are NC Here, as described above, the solenoid valve 21 for heating and the solenoid valve 22 for dehumidifying are the normally closed type solenoid valves which close during the non-energization. Therefore, in a case of stopping the vehicle air conditioner device 1 in this heating mode, the solenoid valve 21 closes, and hence there is obstructed movement of the refrigerant and oil from the outdoor heat exchanger 7 to the accumulator 12 via the refrigerant pipes 13A, 13D and 13C.

Furthermore, even when stopping the vehicle air conditioner device 1 in the heating mode, the solenoid valve 22 for dehumidifying is not opened. In this heating mode, a large pressure difference is generated before and after the solenoid valve 22, but the solenoid valve 22 closes, and hence a noise to be generated in a case of opening is not generated.

(2) Flow of Refrigerant of Dehumidifying and Heating Mode

Next, in the dehumidifying and heating mode, the controller 32 energizes the solenoid valve 22 for dehumidifying to open the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the internal heat exchanger 19 and the evaporation pressure adjustment valve 11 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, thereby performing the dehumidifying and heating of the vehicle interior.

The controller 32 controls the number of revolution of the compressor 2 on the basis of the high pressure side pressure of the refrigerant circuit R which is detected by the discharge pressure sensor 42 or the radiator pressure sensor 47 (the discharge refrigerant pressure of the compressor 2 or the radiator pressure), controls the temperature of the air passed through the radiator 4 (the temperature of the air heated in the radiator 4) and also controls a valve position of the outdoor expansion valve 6 with a small bore (the valve position: small) on the basis of the temperature of the heat absorber 9 which is detected by the heat absorber temperature sensor 48.

That is, in this dehumidifying and heating mode, the controller 32 controls the temperature of the heat absorber 9 by the valve position of the outdoor expansion valve 6, and controls the temperature of the air passed through the radiator 4 by the number of revolution of the compressor 2. Furthermore, the controller 32 opens (non-energizes)/closes (energizes) the evaporation pressure adjustment valve 11 on the basis of the temperature of the heat absorber 9 which is detected by the heat absorber temperature sensor 48, thereby preventing the disadvantage that the temperature of the heat absorber 9 excessively lowers to freeze the heating capability.

(3) Flow of Refrigerant of Internal Cycle Mode

Next, in the internal cycle mode, the controller 32 shuts off the outdoor expansion valve 6 in the above state of the dehumidifying and heating mode (a shut off position), and also adjusts the solenoid valve 21 for heating to be non-energized to close the solenoid valve 21. When the outdoor expansion valve 6 and the solenoid valve 21 close, inflow of the refrigerant into the outdoor heat exchanger 7 and outflow of the refrigerant from the outdoor heat exchanger 7 are obstructed, and hence all the condensed refrigerant flowing through the radiator 4 and the refrigerant pipe 13E flows through the solenoid valve 22 for dehumidifying to the refrigerant pipe 13F.

Then, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the internal heat exchanger 19, the evaporation pressure adjustment valve 11 (non-energized to open), the refrigerant pipe 13C and the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle mode, the refrigerant circulates between the radiator 4 (heat radiation) and the heat absorber 9 (heat absorption) which are present in the air flow passage 3 on an indoor side, and hence the heat is not pumped up from the outdoor air, but a heating capability for a consumed power of the compressor 2 is exerted. The whole amount of the refrigerant flows through the heat absorber 9 which exerts a dehumidifying operation, and hence as compared with the above dehumidifying and heating mode, a dehumidifying capability is higher, but the heating capability lowers.

The controller 32 controls the number of revolution of the compressor 2 on the basis of the temperature of the heat absorber 9 or the above-mentioned high pressure side pressure of the refrigerant circuit R. At this time, the controller 32 selects a smaller compressor target number of revolution from compressor target numbers of revolution obtainable by calculations from the temperature of the heat absorber 9 or the high pressure side pressure, to control the compressor 2.

(4) Flow of Refrigerant of Dehumidifying and Cooling Mode

Next, in the dehumidifying and cooling mode, the controller 32 adjusts the solenoid valve 17 for cooling to be non-energized to open the solenoid valve 17 and adjusts the solenoid valve 21 for heating to be non-energized to close the solenoid valve 21. Furthermore, the controller adjusts the solenoid valve 22 for dehumidifying to be non-energized to close the solenoid valve 22. Then, the controller operates the compressor 2 and the respective blowers 15 and 27, and the air mix damper 28 has the state of passing the air blown out from the indoor blower 27 through the heating medium-air heat exchanger 40 and the radiator 4. In consequence, the high-temperature high-pressure gas refrigerant discharged from the compressor 2 flows into the radiator 4. Through the radiator 4, the air in the air flow passage 3 passes, and hence the air in the air flow passage 3 heats by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled with a large bore (the valve position: large), to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 for cooling to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the internal heat exchanger 19, the evaporation pressure adjustment valve 11 (non-energized to open) and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), thereby performing the dehumidifying and cooling of the vehicle interior.

The controller 32 controls the number of revolution of the compressor 2 on the basis of the temperature of the heat absorber 9 which is detected by the heat absorber temperature sensor 48, also controls the valve position of the outdoor expansion valve 6 on the basis of the above-mentioned high pressure side pressure of the refrigerant circuit R, and controls a refrigerant pressure of the radiator 4, thereby controlling the temperature of the air passed through the radiator 4.

(5) Flow of Refrigerant of Cooling Mode

Next, in the cooling mode, the controller 32 fully opens the outdoor expansion valve 6 (adjusts the valve position into an upper limit of controlling) in the above state of the dehumidifying and cooling mode, and the air mix damper 28 has a state where the air does not pass through the heating medium-air heat exchanger 40 and the radiator 4. However, the air may slightly pass. That is, in this cooling mode, all the solenoid valves 17, 21 and 22 and the evaporation pressure adjustment valve 11 are non-energized.

In consequence, the high-temperature high-pressure gas refrigerant discharged from the compressor 2 flows into the radiator 4. The air in the air flow passage 3 does not pass through the radiator 4, the refrigerant therefore only passes the radiator, and the refrigerant flowing out from the radiator 4 flows through the refrigerant pipe 13E to reach the outdoor expansion valve 6. At this time, the outdoor expansion valve 6 is fully opened, and hence the refrigerant passes through the outdoor expansion valve 6, and flows into the outdoor heat exchanger 7 as it is, in which the refrigerant is cooled by the running therein or the outdoor air passing through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by the heat absorbing operation at this time, and hence the air is cooled.

The refrigerant evaporated in the heat absorber 9 flows through the internal heat exchanger 19, the evaporation pressure adjustment valve 11 (non-energized to open) and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 to the vehicle interior (the air may slightly pass), thereby performing cooling of the vehicle interior. In this cooling mode, the controller 32 controls the number of revolution of the compressor 2 on the basis of the temperature of the heat absorber 9 which is detected by the heat absorber temperature sensor 48.

(6) Changing of Operation Mode

On startup, the controller 32 selects one of the above respective operation modes on the basis of an outdoor air temperature Tam detected by the outdoor air temperature sensor 33 and a target outlet temperature TAO. Then, after the startup, the controller selects and changes each operation mode described above in accordance with changes of environments of the outdoor air temperature Tam, the target outlet temperature TAO and the like and setting conditions.

(7) Auxiliary Heating by Heating Medium Circulating Circuit

Furthermore, in a case of judging that the heating capability by the radiator 4 runs short in the above heating mode or when a failure of the solenoid valve or the like occurs as described later, the controller 32 energizes the heating medium heating electric heater 35 to generate heat, and operates the circulating pump 30, thereby executing the heating by the heating medium-air heat exchanger 40 of the heating medium circulating circuit 23.

When the circulating pump 30 of the heating medium circulating circuit 23 is operated and the heating medium heating electric heater 35 is energized, the heating medium (a high-temperature heating medium) heated by the heating medium heating electric heater 35 as described above circulates through the heating medium-air heat exchanger 40, and hence the air flowing into the radiator 4 of the air flow passage 3 heats. Consequently, in a case where the heating capability generable in the radiator 4 runs short to the required heating capability, the controller complements the heating capability for the shortage in the heating medium circulating circuit 23.

(8) Control in Case where Failures Occur in Solenoid Valves 17, 21 and 22, Evaporation Pressure Adjustment Valve 11, or Outdoor Expansion Valve 6 (the Air Conditioning Mode During Failure)

Next, there will be described an operation of the controller 32 in a case where a failure such as coil disconnection or adhesion occurs in the respective solenoid valves 17, 21 and 22, the evaporation pressure adjustment valve 11 and the outdoor expansion valve 6 which constitute the refrigerant circuit R. First, the controller 32 always electrically monitors whether or not the failure (the coil disconnection or short-circuit) occurs in each of the solenoid valves 17, 21 and 22, the evaporation pressure adjustment valve 11 and the outdoor expansion valve 6.

(8-1) Electric Failure Detecting Method

Figure 5:
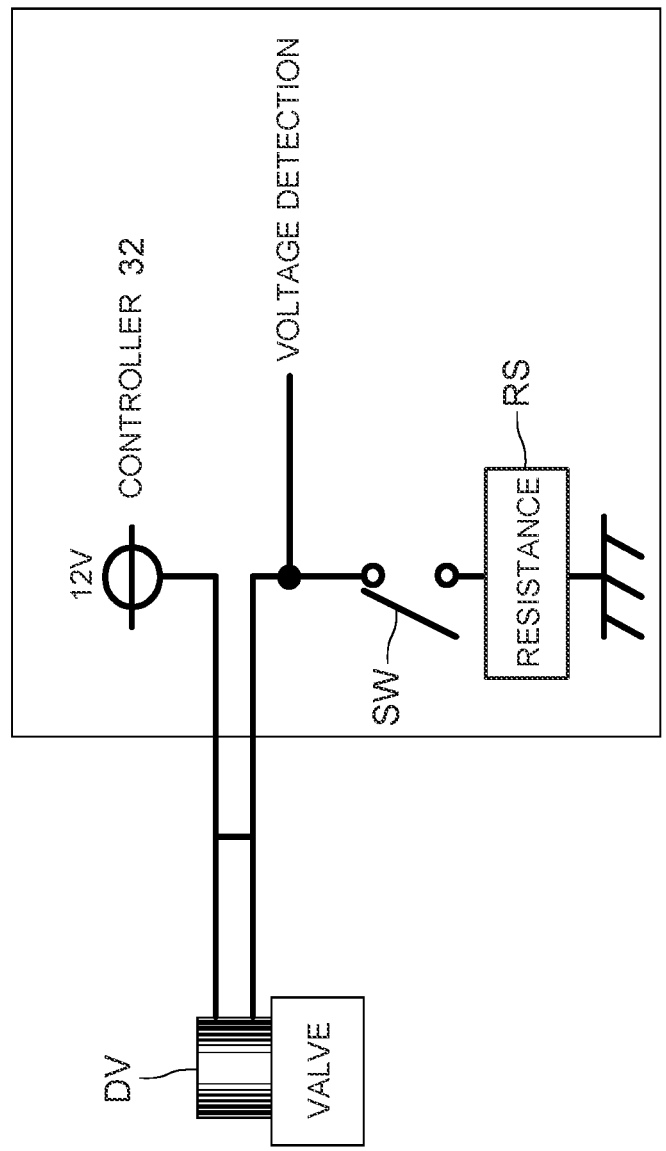
FIG. 5 is a view to explain another example of the electric failure detecting method in the present invention.
Figure 6:
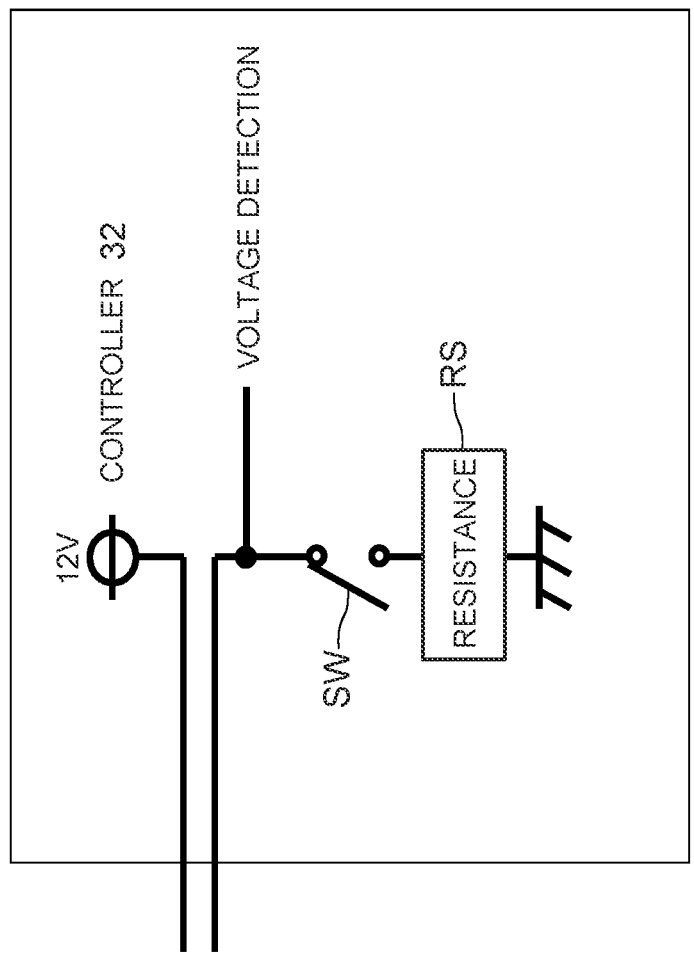
FIG. 6 is a view to explain still another example of the electric failure detecting method in the present invention.

FIG. 4 to FIG. 6 show examples of such a failure detecting method. In the respective drawings, DV denotes a valve that is one of the solenoid valves 17, 21 and 22, the evaporation pressure adjustment valve 11 and the outdoor expansion valve 6, SW denotes a switch to be opened/closed by the controller 32, and RS denotes a resistor. These components are connected in series between a DC power source (12 V) and ground, and the controller 32 monitors a terminal voltage of the resistor RS.

At such a normal time as shown in FIG. 4, when the controller 32 closes the switch SW, there is detected the terminal voltage which appears at a terminal of the resistor RS due to an operation current of the valve DV. Furthermore, when the switch SW is opened, a power source voltage (12 V) is detected. Here, in a case where a coil of the valve DV short-circuits as shown in FIG. 5, when the switch SW is closed, the power source voltage (12 V) is detected, and hence the controller 32 can detect occurrence of the short-circuit. However, when the switch SW opens, the occurrence is not detectable (in this case, at a predetermined timing, the switch SW may be closed for a short time to detect the failure). On the other hand, in a case where the coil of the valve DV is disconnected as shown in FIG. 6, when the switch SW is closed, a ground potential (GND) is detected, and when the switch SW is opened, a floating state is obtained, so that the controller 32 can detect the disconnection of the coil of the valve DV. In consequence, these functions constitute failure detecting means of the controller 32.

Then, in a case of detecting that the coil of one of the solenoid valves 17, 21 and 22, the evaporation pressure adjustment valve 11 and the outdoor expansion valve 6 is disconnected (also including a case of detecting that the coil is adhered as described later), the controller 32 first performs alarm display to the effect that such a failure occurs in the display 61 of the air conditioning operating portion 53, and prompts a user to immediately perform repair. Next, in accordance with the operation mode which is currently being executed or the selected operation mode, the controller selects and executes the air conditioning mode during failure mentioned below among the above-mentioned plurality of types of air conditioning modes during failure.

(8-2) Operation in Case where Solenoid Valve 21 for Heating is Disconnected in Dehumidifying and Heating Mode FIG. 7 shows a case where the coil of the solenoid valve 21 for heating is disconnected in the above-mentioned dehumidifying and heating mode. When the coil of the solenoid valve 21 for heating is disconnected in executing the dehumidifying and heating mode, all the refrigerant flows to a heat absorber 9 side, and hence the temperature of the heat absorber 9 lowers. Furthermore, the solenoid valve 21 does not open, the refrigerant accordingly accumulates in the outdoor heat exchanger 7, and hence a suction refrigerant pressure of the compressor 2 decreases, and a state of a vacuum operation causes damage to the compressor 2.

To eliminate the problem, in a case where the controller 32 detects that the disconnection failure of the coil of the solenoid valve 21 for heating occurs in executing the dehumidifying and heating mode, the controller adjusts all of the solenoid valves 17, 21 and 22 and the evaporation pressure adjustment valve 11 to be non-energized to open the valves, and changes the flow of the refrigerant to the above-mentioned dehumidifying and cooling mode (the operation mode which enables cooling more than the dehumidifying and heating mode) in which the controller controls the outdoor expansion valve 6 with the large bore.

Furthermore, in this flow of the dehumidifying and cooling mode, the heating capability (the heat radiation) which is generable in the radiator 4 runs short to the required heating capability, and hence as described above, the controller energizes the heating medium heating electric heater 35 of the heating medium circulating circuit 23 to generate heat, operates the circulating pump 30, and executes the heating by the heating medium-air heat exchanger 40, thereby executing the air conditioning mode during failure to complement of the heating capability for this shortage in the heating medium circulating circuit 23.

By executing this air conditioning mode during failure, it is possible to secure the dehumidifying of the vehicle interior, and avoid in advance the disadvantage that the window glass of the vehicle is fogged, or the like, thereby achieving safe running. Furthermore, the controller changes the flow of the refrigerant to the dehumidifying and cooling mode which more enables the cooling, and performs the heating by the heating medium-air heat exchanger 40 of the heating medium circulating circuit 23 as required, so that it is possible to eliminate the temperature drop of the vehicle interior, thereby achieving the comfortable air conditioning, while securing the dehumidifying of the vehicle interior. Especially, it is possible to avoid damages on the compressor 2 due to the disconnection of the solenoid valve 21 for heating. Here, the controller may change the flow of the refrigerant to the above-mentioned internal cycle mode during the failure, but as in the embodiment, the controller changes the flow to the dehumidifying and cooling mode, thereby making it possible to more stably continue the comfortable dehumidifying and temperature control of the vehicle interior.

(8-3) Operation in Case where Solenoid Valve 22 for Dehumidifying is Disconnected in Dehumidifying and Heating Mode Next, FIG. 8 shows a case where the coil of the solenoid valve 22 for dehumidifying is disconnected in the dehumidifying and heating mode. When the coil of the solenoid valve 22 for dehumidifying is disconnected in executing the dehumidifying and heating mode, the refrigerant does not flow to the heat absorber 9 side. Therefore, the dehumidifying of the vehicle interior cannot be performed, and there is the fear that the window glass of the vehicle is fogged.

To eliminate the problem, in a case where the controller 32 detects that the disconnection failure of the coil of the solenoid valve 22 for dehumidifying occurs in executing the dehumidifying and heating mode, the controller similarly adjusts all of the solenoid valves 17, 21 and 22 and the evaporation pressure adjustment valve 11 to be non-energized to open the valves, and changes the flow of the refrigerant to the dehumidifying and cooling mode (the operation mode which enables the cooling more than the dehumidifying and heating mode) in which the controller controls the outdoor expansion valve 6 with the large bore.

Similarly, in this flow of the dehumidifying and cooling mode, the heating capability (the heat radiation) which is generable in the radiator 4 runs short to the required heating capability, and hence as described above, the controller energizes the heating medium heating electric heater 35 of the heating medium circulating circuit 23 to generate heat, operates the circulating pump 30, and executes the heating by the heating medium-air heat exchanger 40, thereby executing the air conditioning mode during failure to complement the heating capability for this shortage in the heating medium circulating circuit 23. Consequently, it is similarly possible to stably continue the comfortable dehumidifying and temperature control of the vehicle interior.

(8-4) Operation in Case where Solenoid Valve 22 for Dehumidifying is Disconnected in Internal Cycle Mode Next, FIG. 9 shows a case where the coil of the solenoid valve 22 for dehumidifying is disconnected in the internal cycle mode. When the coil of the solenoid valve 22 for dehumidifying is disconnected in executing the above-mentioned internal cycle mode, the circuit is cut off, and hence the refrigerant circuit R is not established. Therefore, the discharge refrigerant pressure and suction refrigerant pressure of the compressor 2 have abnormal values, and there is the risk that the compressor 2 is seriously damaged.

To eliminate the problem, in a case where the controller 32 detects that the disconnection failure of the coil of the solenoid valve 22 for dehumidifying occurs in executing the internal cycle mode, the controller also adjusts all of the solenoid valves 17, 21 and 22 and the evaporation pressure adjustment valve 11 to be non-energized to open the valves, and changes the flow of the refrigerant to the dehumidifying and cooling mode (the operation mode which enables the cooling more than the internal cycle mode) in which the controller controls the outdoor expansion valve 6 with the large bore.

Then, in this flow of the dehumidifying and cooling mode, the heating capability (the heat radiation) which is generable in the radiator 4 similarly runs short to the required heating capability, and hence as described above, the controller energizes the heating medium heating electric heater 35 of the heating medium circulating circuit 23 to generate heat, operates the circulating pump 30, and executes the heating by the heating medium-air heat exchanger 40, thereby executing the air conditioning mode during failure to complement the heating capability for this shortage in the heating medium circulating circuit 23. Consequently, it is possible to stably continue the comfortable dehumidifying and temperature control of the vehicle interior, while avoiding the disadvantage that the failure of the solenoid valve 22 for dehumidifying causes damage to the compressor 2.

(8-5) Operation in Case where Evaporation Pressure Adjustment Valve 11 is Disconnected in Dehumidifying and Heating Mode Next, FIG. 10 shows a case where the coil of the evaporation pressure adjustment valve 11 is disconnected in the dehumidifying and heating mode. When the coil of the evaporation pressure adjustment valve 11 is disconnected in executing the dehumidifying and heating mode, the valve cannot close even when the temperature of the heat absorber 9 lowers, and hence there is the risk that the temperature of the heat absorber 9 lowers and the heat absorber freezes.

To eliminate the problem, in a case where the controller 32 detects that the disconnection failure of the coil of the evaporation pressure adjustment valve 11 occurs in executing the dehumidifying and heating mode, the controller similarly adjusts all of the solenoid valves 17, 21 and 22 and the evaporation pressure adjustment valve 11 to be non-energized to open the valves, and changes the flow of the refrigerant to the dehumidifying and cooling mode (the operation mode which enables the cooling more than the dehumidifying and heating mode) in which the controller controls the outdoor expansion valve 6 with the large bore.

Then, in this flow of the dehumidifying and cooling mode, the heating capability (the heat radiation) which is generable in the radiator 4 similarly runs short to the required heating capability, and hence as described above, the controller energizes the heating medium heating electric heater 35 of the heating medium circulating circuit 23 to generate heat, operates the circulating pump 30 is operated, and executes the heating by the heating medium-air heat exchanger 40, thereby executing the air conditioning mode during failure to complement the heating capability for this shortage in the heating medium circulating circuit 23. Consequently, it is possible to stably continue the comfortable dehumidifying and temperature control of the vehicle interior, while avoiding the freezing of the heat absorber 9.

(8-6) Operation in Case where Outdoor Expansion Valve 6 is Disconnected in Dehumidifying and Heating Mode Next, FIG. 11 shows a case where the coil of the outdoor expansion valve 6 is disconnected in the dehumidifying and heating mode. As described above, in the dehumidifying and heating mode, the controller 32 controls the temperature of the heat absorber 9 by the valve position of the outdoor expansion valve 6, and hence when the coil of the outdoor expansion valve 6 is disconnected in executing this dehumidifying and heating mode, the controller 32 cannot control the temperature of the heat absorber 9.

To eliminate the problem, in a case where the controller 32 detects that the disconnection failure of the coil of the outdoor expansion valve 6 occurs in executing the dehumidifying and heating mode, the controller leaves the state of all of the solenoid valves 17, 21 and 22 and the evaporation pressure adjustment valve 11 as it is, and controls the number of revolution of the compressor 2 on the basis of the temperature of the heat absorber 9 which is detected by the heat absorber temperature sensor 48 without changing the flow of the refrigerant. That is, there is obtained a state where the controller controls the temperature of the heat absorber 9 by the compressor 2.

In this case, the temperature of the air passed through the radiator 4 takes its own course, and hence the controller 32 increases an amount of the air which does not pass the heating medium-air heat exchanger 40 and the radiator 4 but is to be blown out to the vehicle interior, by the air mix damper 28, on the basis of the temperature Tci of the radiator 4 which is detected by the radiator temperature sensor 46, in a case where the temperature Tci of the radiator 4 (the temperature of the air passed through the radiator 4) is high. Conversely, in a case where the temperature Tci of the radiator 4 is low, the controller energizes the heating medium heating electric heater 35 of the heating medium circulating circuit 23 to generate heat, operates the circulating pump 30, and executes the heating by the heating medium-air heat exchanger 40, thereby executing the air conditioning mode during failure to complement the heating capability for the shortage of the heat radiation of the radiator 4 in the heating medium circulating circuit 23.

Consequently, the controller controls the temperature of the air to be blown out to the vehicle interior with the heating by the air mix damper 28 and the heating medium-air heat exchanger 40 of the heating medium circulating circuit 23, while controlling the temperature of the heat absorber 9 by the compressor 2, and hence it is possible to continuously control both of the temperature of the heat absorber 9 and the temperature of the air to be blown out to the vehicle interior without any hindrance, and it is possible to continue the comfortable air conditioning of the vehicle interior.

(8-7) Operation in Case where Outdoor Expansion Valve 6 is Disconnected in Dehumidifying and Cooling Mode Next, FIG. 12 shows a case where the coil of the outdoor expansion valve 6 is disconnected in the dehumidifying and cooling mode. As described above, in the dehumidifying and cooling mode, the controller 32 controls the temperature of the air passed through the radiator 4 by the valve position of the outdoor expansion valve 6, and hence when the coil of the outdoor expansion valve 6 is disconnected in executing this dehumidifying and cooling mode, the controller 32 cannot control the temperature of the air passed through the radiator 4.

To eliminate the problem, in a case where the controller 32 detects that the disconnection failure of the coil of the outdoor expansion valve 6 occurs in executing the dehumidifying and cooling mode, the controller leaves the state of all of the solenoid valves 17, 21 and 22 and the evaporation pressure adjustment valve 11 as it is, energizes the heating medium heating electric heater 35 of the heating medium circulating circuit 23 to generate heat, and operates the circulating pump 30 on the basis of the temperature Tci of the radiator 4 which is detected by the radiator temperature sensor 46 without changing the flow of the refrigerant, in a case where the temperature Tci of the radiator 4 (the temperature of the air passed through the radiator 4) is low, thereby executing the heating by the heating medium-air heat exchanger 40 to complement the heating capability for the shortage of the heat radiation of the radiator 4 in the heating medium circulating circuit 23. Conversely, in a case where the temperature Tci of the radiator 4 is high, the vehicle air conditioner device executes the air conditioning mode during failure in which the controller increases the amount of the air which does not pass the heating medium-air heat exchanger 40 and the radiator 4 but is to be blown out to the vehicle interior by the air mix damper 28, and lowers the temperature of the air to be blown out to the vehicle interior.

In this way, the controller optimally controls the heating by the heating medium-air heat exchanger 40 of the heating medium circulating circuit 23 and the temperature of the air to be blown out to the vehicle interior by the air mix damper 28, and hence it is possible to continuously control the temperature of the air to be blown out to the vehicle interior without any hindrance, and it is possible to continue the comfortable air conditioning of the vehicle interior.

(8-8) Operation in Case where Solenoid Valve 21 for Heating is Disconnected in Heating Mode Next, FIG. 13 shows a case where the coil of the solenoid valve 21 for heating is disconnected in the above-mentioned dehumidifying and heating mode. As described above, in the heating mode, the solenoid valve 17 for cooling and the solenoid valve 22 for dehumidifying close, and hence when the coil of the solenoid valve 21 for heating is disconnected to close in executing this heating mode, the circuit is cut off and the refrigerant circuit R is not established. Furthermore, the suction refrigerant pressure of the compressor 2 becomes abnormal, and there is the risk that the compressor 2 is seriously damaged. However, even when the mode changes to the other operation mode, the refrigerant flows through the heat absorber 9 in any case, and hence there is the problem that the heat absorber 9 freezes.

To eliminate the problem, in a case where the controller 32 detects the disconnection failure occurs in the coil of the solenoid valve 21 for heating in executing the heating mode, the controller stops the operation of the compressor 2. However, the indoor blower 27 operates. Then, the controller energizes the heating medium heating electric heater 35 of the heating medium circulating circuit 23 to generate heat in accordance with the required heating capability, and operates the circulating pump 30, thereby executing the air conditioning mode during failure in which the controller performs the heating of the air in the air flow passage by the heating medium-air heat exchanger 40. Consequently, it is possible to continue the heating of the vehicle interior by the heating medium-air heat exchanger 40 of the heating medium circulating circuit 23, while avoiding the disadvantage that the disconnection of the solenoid valve 21 for heating causes damage to the compressor 2.

(8-9) Operation in Case where Outdoor Expansion Valve 6 is Disconnected in Heating Mode Next, FIG. 14 shows a case where the coil of the outdoor expansion valve 6 is disconnected in the above-mentioned heating mode. In this heating mode, as described above, the controller controls the subcool degree of the refrigerant in the outlet of the radiator 4 by the valve position of the outdoor expansion valve 6. When the coil of the outdoor expansion valve 6 is disconnected in executing this heating mode, the controller cannot control the subcool degree of the refrigerant in the outlet of the radiator 4.

That is, the controller cannot control the subcool degree of the refrigerant in the outlet of the radiator 4 into an optimal value, and a heating efficiency deteriorates, but the heating of the vehicle interior is achievable. Furthermore, any hindrance does not occur in another apparatus, and also when the operation mode changes to the other operation mode, the refrigerant flows through the heat absorber 9 in any case, thereby causing the problem that the heat absorber 9 freezes. Therefore, the controller 32 leaves the state of all of the solenoid valves 17, 21 and 22 and the evaporation pressure adjustment valve 11 in the heating mode, and continues the operation in the heating mode without changing the flow of the refrigerant.

(8-10) Operation in Case where Solenoid Valve 17 for Cooling is Disconnected in Heating Mode Next, FIG. 15 shows a case where the coil of the solenoid valve 17 for cooling is disconnected in the heating mode. In this heating mode, the solenoid valve 17 for cooling closes as described above, and hence when the coil of the solenoid valve 17 for cooling is disconnected in executing this heating mode, the solenoid valve 17 opens.

However, even when the solenoid valve 17 opens, a very small amount of the refrigerant only flows in a direction of the receiver drier portion 14, and hence the flow of the refrigerant does not substantially change, and the heating of the vehicle interior is achievable. Furthermore, any hindrance does not occur in the other apparatus, and also when the operation mode changes to the other operation mode, the refrigerant similarly flows through the heat absorber 9 in any case, thereby causing the problem that the heat absorber 9 freezes. Therefore, the controller 32 leaves the state of all of the solenoid valves 17, 21 and 22 and the evaporation pressure adjustment valve 11 in the heating mode, and continues the operation in the heating mode without changing the flow of the refrigerant.

(8-11) Operation in Case where Solenoid Valve 17 for Cooling is Disconnected in Dehumidifying and Heating Mode Next, FIG. 16 shows a case where the coil of the solenoid valve 17 for cooling is disconnected in the dehumidifying and heating mode. Also in this dehumidifying and heating mode, the solenoid valve 17 for cooling closes as described above, and hence when the coil of the solenoid valve 17 for cooling is disconnected in executing this dehumidifying and heating mode, the solenoid valve 17 opens.

However, also in this case, the very small amount of the refrigerant only flows from the solenoid valve 17 in the direction of the receiver drier portion 14, and hence the flow of the refrigerant does not substantially change, and the dehumidifying and heating of the vehicle interior is achievable. Furthermore, any hindrance does not occur in the other apparatus, and hence the controller 32 leaves the state of all of the solenoid valves 17, 21 and 22 and the evaporation pressure adjustment valve 11 in the dehumidifying and heating mode, and continues the operation in the dehumidifying and heating mode without changing the flow of the refrigerant.

(8-12) Failure Detecting Method Based on Abnormality of Refrigerant Circuit R

Figure 17:
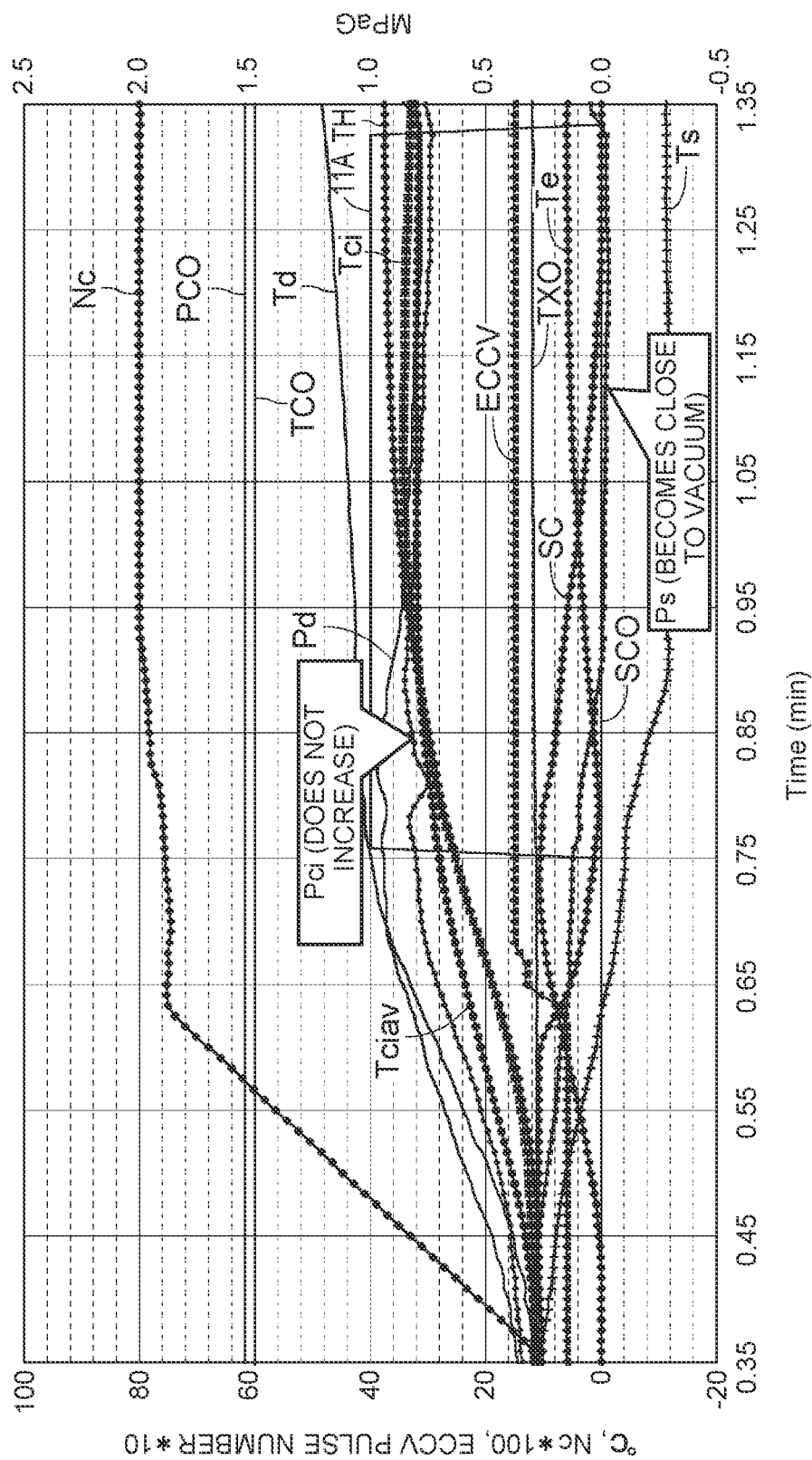
FIG. 17 is a view to explain one example of a method of detecting a failure on the basis of an abnormality of a refrigerant circuit.

Next, FIG. 17 shows states of a temperature and a pressure of each portion of the refrigerant circuit R. In this drawing, Nc is the number of revolution of the compressor 2, PCO is a radiator target pressure (a targeted pressure of the radiator 4), TCO is a radiator target temperature (a targeted temperature of the radiator 4), Td is a discharge refrigerant temperature of the compressor 2 which is detected by the discharge temperature sensor 43, 11A is an opened/closed state (the upside indicates the closed state, and the downside indicates the opened state) of the evaporation pressure adjustment valve 11, TH is a temperature of the air through the heating medium-air heat exchanger 40 which is detected by the heating medium-air heat exchanger temperature sensor 55, Tci is a temperature of the air through the radiator 4 which is detected by the radiator temperature sensor 46, Tciav is an average temperature, Pd is a discharge refrigerant pressure of the compressor 2 which is detected by the discharge pressure sensor 42, Pci is a radiator pressure detected by the radiator pressure sensor 47, ECCV is a valve position (a pulse number) of the outdoor expansion valve 6, TXO is a refrigerant evaporation temperature of the outdoor heat exchanger 7 which is detected by the outdoor heat exchanger temperature sensor 54, Te is a heat absorber temperature detected by the heat absorber temperature sensor 48, SC is a subcool degree of the refrigerant in the radiator 4, SCO is the target value (a target subcool degree), Ts is a suction refrigerant temperature of the compressor 2 which is detected by the suction temperature sensor 60, and Ps is a suction refrigerant pressure of the compressor 2 which is detected by the suction pressure sensor 44.

As described above, in the dehumidifying and cooling mode, the outdoor heat exchanger 7 and the heat absorber 9 function as evaporators, but in a case where the solenoid valve 21 for heating has adhered and remains to be closed (does not open even when energized) for a certain cause as shown in FIG. 18, the refrigerant circuit R falls in a state close to a closed circuit, and hence the suction refrigerant pressure Ps of the compressor 2 decreases, to reach a state of vacuum operation. Furthermore, the refrigerant accumulates in the outdoor heat exchanger 7, and hence the refrigerant pressure Pci does not increase. Furthermore, such a situation of the refrigerant circuit is not seen except in the case where the solenoid valve 21 for heating has adhered in the dehumidifying and heating mode.

(8-13) Operation in Case where Solenoid Valve 21 for Heating has Adhered in Dehumidifying and Heating Mode To eliminate the problem, in a case where in executing the dehumidifying and heating mode, the controller 32 judges from such a situation of the refrigerant circuit R that the solenoid valve 21 for heating is adhered (this function constitutes failure detecting means), the controller adjusts all of the solenoid valves 17, 21 and 22 and the evaporation pressure adjustment valve 11 to be non-energized to open the valves as shown by an arrow in FIG. 18, and changes the flow of the refrigerant to the above-mentioned dehumidifying and cooling mode (the operation mode which enables the cooling more than the dehumidifying and heating mode) in which the controller controls the outdoor expansion valve 6 with the large bore.

Furthermore, in this flow of the dehumidifying and cooling mode, the heating capability (the heat radiation) generable in the radiator 4 runs short to the required heating capability, and hence as described above, the controller energizes the heating medium heating electric heater 35 of the heating medium circulating circuit 23 to generate heat, and operates the circulating pump 30 to execute the heating by the heating medium-air heat exchanger 40, thereby executing the air conditioning mode during failure in which the controller complements the heating capability for this shortage in the heating medium circulating circuit 23.

By executing this air conditioning mode during failure, it is possible to secure the dehumidifying of the vehicle interior, avoid in advance the disadvantage that the window glass of the vehicle is fogged or the like and achieve safe running. Then, the controller changes the flow of the refrigerant to the dehumidifying and cooling mode which more enables the cooling, and performs the heating by the heating medium-air heat exchanger 40 of the heating medium circulating circuit 23 as required, and hence it is possible to eliminate temperature drop of the vehicle interior and achieve comfortable air conditioning, while securing the dehumidifying of the vehicle interior. Especially, it is possible to avoid the damages on the compressor 2 due to the adhesion of the solenoid valve 21 for heating.

(9) Another Example of Auxiliary Heating Means

Figure 19:
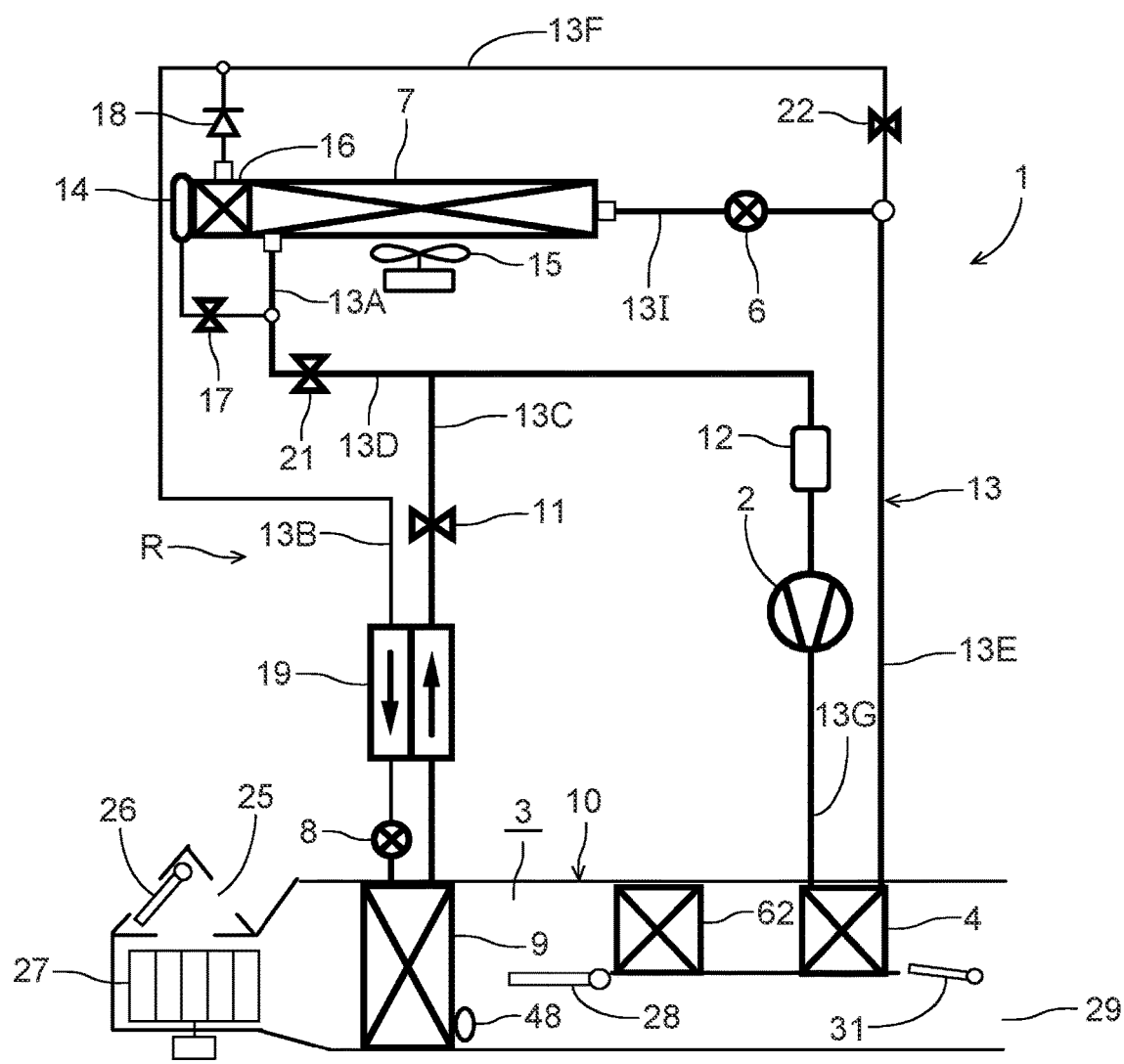
FIG. 19 is a constitutional view of a vehicle air conditioner device of another embodiment to which the present invention is applied.

It is to be noted that in the above embodiment, the heating medium circulating circuit 23 is employed as the auxiliary heating means, but a usual electric heater (e.g., a PTC heater) 62 may constitute the auxiliary heating means. FIG. 19 shows a constitutional example corresponding to FIG. 1 in this case. In this drawing, the heating medium circulating circuit 23 of FIG. 1 is replaced with the electric heater 62 of this case.

In this way, the air to be supplied to the vehicle interior may be heated with the electric heater 62, and according to such a constitution, there is the advantage that a structure is simplified as compared with a case of using the heating medium circulating circuit 23.

Furthermore, in the above respective embodiments, the solenoid valve 21 and the solenoid valve 17 are constituted of separate solenoid valves, but may be constituted of an integrated three-way valve. In this case, in a non-energized state, a side of the three-way valve toward the receiver drier portion 14 is opened, and a side thereof toward the refrigerant pipe 13C is closed.

Furthermore, in the embodiments, the present invention is applied to the vehicle air conditioner device 1 which changes and executes the respective operation modes of the heating mode, the dehumidifying and heating mode, the internal cycle mode, the dehumidifying and cooling mode and the cooling mode, but the invention of claim 1 is not limited to the embodiment, and the present invention is also effective in a vehicle air conditioner device which performs one of these modes or any combination of two modes, as the dehumidifying mode.

Furthermore, needless to say, the constitution of the refrigerant circuit R described above in each embodiment is not limited to the embodiment, and is changeable without departing from the gist of the present invention.

DESCRIPTION OF REFERENCE NUMERALS

1 vehicle air conditioner device
2 compressor
3 air flow passage
4 radiator
6 outdoor expansion valve
7 outdoor heat exchanger
8 indoor expansion valve
9 heat absorber
11 evaporation pressure adjustment valve
17, 21 and 22 solenoid valve
23 heating medium circulating circuit
26 suction changing damper
27 indoor blower (blower fan)
28 air mix damper
30 circulating pump (circulating means)
32 controller (control means)
35 heating medium heating electric heater (electric heater)
40 heating medium-air heat exchanger (auxiliary heating means)
62 electric heater (auxiliary heating means)
R refrigerant circuit

The invention claimed is:

1. A vehicle air conditioner device comprising:
a compressor which compresses a refrigerant;
an air flow passage through which air to be supplied to a vehicle interior flows;
a radiator which lets the refrigerant radiate heat to heat the air to be supplied from the air flow passage to the vehicle interior;
a heat absorber which lets the refrigerant absorb heat to cool the air to be supplied from the air flow passage to the vehicle interior;
an outdoor heat exchanger disposed outside the vehicle interior to let the refrigerant radiate or absorb heat;
a plurality of solenoid valves to change a flow of the refrigerant of a refrigerant circuit;
auxiliary heating means for heating the air to be supplied from the air flow passage to the vehicle interior; and
control means for controlling the compressor, the solenoid valves and the auxiliary heating means,
the vehicle air conditioner device controlling the solenoid valves by the control means to change the flow of the refrigerant, thereby executing one of:
a heating mode in which the control means lets the refrigerant discharged from the compressor radiate heat in the radiator, decompresses the refrigerant by which heat has been radiated, and then lets the refrigerant absorb heat in the outdoor heat exchanger;
a dehumidifying mode in which the control means lets the refrigerant discharged from the compressor radiate heat in the radiator, decompresses the refrigerant by which heat has been radiated, and then lets the refrigerant absorb heat in the heat absorber; and
a cooling mode in which the control means lets the refrigerant discharged from the compressor radiate heat in the outdoor heat exchanger, decompresses the refrigerant by which heat has been radiated, and then lets the refrigerant absorb heat in the heat absorber,
wherein the dehumidifying mode includes:
a dehumidifying and heating mode in which the control means lets the refrigerant discharged from the compressor radiate heat in the radiator, decompresses the refrigerant by which heat has been radiated, and lets the refrigerant absorb heat in the heat absorber and the outdoor heat exchanger; and
a dehumidifying and cooling mode in which the control means lets the refrigerant discharged from the compressor radiate heat in the radiator and the outdoor heat exchanger, decompresses the refrigerant by which heat has been radiated, and lets the refrigerant absorb heat in the heat absorber, and
wherein the control means has a predetermined air conditioning mode during failure, and failure detecting means for detecting a failed solenoid valve of the plurality of solenoid valves, and
the control means changes the flow of the refrigerant to the other operation mode that enables dehumidifying of the vehicle interior to obtain the air conditioning mode during failure, to continue the air conditioning of the vehicle interior, in a case of detecting that the failed solenoid valve fails in the dehumidifying and heating mode or the dehumidifying and cooling mode.

2. The vehicle air conditioner device according to claim 1, which executes the air conditioning mode during failure in which the control means changes the flow of the refrigerant to the operation mode in which the vehicle interior can be more cooled, and performs the heating by the auxiliary heating means as required, in a case of detecting that the failed solenoid valve fails in the dehumidifying and heating mode.

3. The vehicle air conditioner device according to claim 1, wherein the plurality of solenoid valves comprises a solenoid valve for heating which is positioned between an outlet of the outdoor heat exchanger and the compressor and is energized to open in the heating mode and the dehumidifying and heating mode, and
executes the air conditioning mode during failure in which the control means changes the flow of the refrigerant to the dehumidifying and cooling mode, and performs the heating by the auxiliary heating means when the heat radiation by the radiator runs short, in a case of detecting that the solenoid valve for heating fails in the dehumidifying and heating mode.

4. The vehicle air conditioner device according to claim 1, wherein the plurality of solenoid valves comprises a solenoid valve for dehumidifying which is connected in parallel with the outdoor heat exchanger and energized to open in the dehumidifying and heating mode, and
executes the air conditioning mode during failure in which the control means changes the flow of the refrigerant to the dehumidifying and cooling mode, and performs the heating by the auxiliary heating means when the heat radiation by the radiator runs short, in a case of detecting that the solenoid valve for dehumidifying fails in the dehumidifying and heating mode.

5. The vehicle air conditioner device according to claim 1, wherein the dehumidifying mode includes an internal cycle mode in which the control means lets the refrigerant discharged from the compressor radiate heat in the radiator, decompresses the refrigerant by which heat has been radiated, and then lets the refrigerant absorb heat in the heat absorber, the plurality of solenoid valves comprising a solenoid valve for dehumidifying which is connected in parallel with the outdoor heat exchanger and energized to open in the internal cycle mode, and executing the air conditioning mode during failure in which the control means changes the flow of the refrigerant to the dehumidifying and cooling mode, and performs the heating by the auxiliary heating means when the heat radiation by the radiator runs short, in a case of detecting that the solenoid valve for dehumidifying fails in the internal cycle mode.

6. The vehicle air conditioner device according to claim 1, which comprises an evaporation pressure adjustment valve which is connected to a refrigerant outlet side of the heat absorber and opened/closed in the dehumidifying and heating mode, wherein the failure detecting means also detects a failure of the evaporation pressure adjustment valve, the vehicle air conditioner device executing the air conditioning mode during failure in which the control means changes the flow of the refrigerant to the dehumidifying and cooling mode, and performs the heating by the auxiliary heating means when the heat radiation by the radiator runs short, in a case of detecting that the evaporation pressure adjustment valve fails in the dehumidifying and heating mode.

7. The vehicle air conditioner device according to claim 1, which comprises:

an air mix damper to adjust a ratio at which the air in the air flow passage passed through the heat absorber is passed through the radiator; and an outdoor expansion valve which throttles and decompresses the refrigerant flowing into the outdoor heat exchanger, wherein the dehumidifying mode includes a dehumidifying and heating mode in which the control means lets the refrigerant discharged from the compressor radiate heat in the radiator, decompresses the refrigerant by which heat has been radiated, and then lets the refrigerant absorb heat in the heat absorber and the outdoor heat exchanger, and in the dehumidifying and heating mode, the control means controls a temperature of the heat absorber by a valve position of the outdoor expansion valve, and controls a temperature of the air passed through the radiator by a number of revolutions of the compressor, and the failure detecting means also detects a failure of the outdoor expansion valve, the vehicle air conditioner device executing the air conditioning mode during failure in which the control means controls the temperature of the heat absorber by the number of revolutions of the compressor without changing a path of the flow of the refrigerant, and controls a temperature of the air to be blown out to the vehicle interior by the air mix damper and the auxiliary heating means, in a case of detecting that the outdoor expansion valve fails in the dehumidifying and heating mode.

8. The vehicle air conditioner device according to claim 1, which comprises:

an air mix damper to adjust a ratio at which the air in the air flow passage passed through the heat absorber is passed through the radiator; and an outdoor expansion valve which throttles and decompresses the refrigerant flowing into the outdoor heat exchanger, wherein the dehumidifying mode includes a dehumidifying and cooling mode in which the control means lets the refrigerant discharged from the compressor radiate heat in the radiator and the outdoor heat exchanger, decompresses the refrigerant by which heat has been radiated, and then lets the refrigerant absorb heat in the heat absorber, and in the dehumidifying and cooling mode, the control means controls a temperature of the air passed through the radiator by a valve position of the outdoor expansion valve, and the failure detecting means also detects a failure of the outdoor expansion valve, the vehicle air conditioner device executing the air conditioning mode during failure in which the control means controls a temperature of the air to be blown out to the vehicle interior by the air mix damper and the auxiliary heating means without changing the flow of the refrigerant, in a case of detecting that the outdoor expansion valve fails in the dehumidifying and cooling mode.

9. The vehicle air conditioner device according to claim 1, wherein the plurality of solenoid valves comprises a solenoid valve for heating which is positioned between an outlet of the outdoor heat exchanger and the compressor and is energized to open in the heating mode, and executes the air conditioning mode during failure in which the control means stops an operation of the compressor and performs the heating by the auxiliary heating means, in a case of detecting that the solenoid valve for heating fails in the heating mode.

10. The vehicle air conditioner device according to claim 1, which comprises:

an outdoor expansion valve which throttles and decompresses the refrigerant flowing into the outdoor heat exchanger; and an evaporation pressure adjustment valve which is connected to a refrigerant outlet side of the heat absorber and opened/closed in the dehumidifying and heating mode, wherein the failure detecting means also detects failures of the outdoor expansion valve and the evaporation pressure adjustment valve, the vehicle air conditioner device executing the air conditioning mode during failure in which the control means continues each operation mode without changing the flow of the refrigerant when the vehicle interior air conditioning is achievable in the operation mode, also in a case of detecting the failed solenoid valve, the outdoor expansion valve and the evaporation pressure adjustment valve in the operation mode.

11. The vehicle air conditioner device according to claim 1,
which comprises:
an outdoor expansion valve which throttles and decompresses the refrigerant flowing into the outdoor heat exchanger; and
an evaporation pressure adjustment valve which is connected to a refrigerant outlet side of the heat absorber and opened/closed in the dehumidifying and heating mode,
wherein the failure detecting means detects the failed solenoid valve, the outdoor expansion valve and the evaporation pressure adjustment valve electrically or in accordance with a situation of a temperature and/or a pressure of the refrigerant circuit.

12. The vehicle air conditioner device according to claim 1,
which comprises a heating medium circulating circuit which has a heating medium-air heat exchanger, an electric heater and circulating means, and circulates a heating medium heated by the electric heater through the heating medium-air heat exchanger by the circulating means,
wherein the heating medium-air heat exchanger constitutes the auxiliary heating means.

13. The vehicle air conditioner device according to claim 1,
wherein the auxiliary heating means is constituted of an electric heater which heats the air to be supplied from the air flow passage to the vehicle interior.

* * * * *